(12) United States Patent
Asahara et al.

(10) Patent No.: US 10,963,297 B2
(45) Date of Patent: Mar. 30, 2021

(54) COMPUTATIONAL RESOURCE MANAGEMENT DEVICE, COMPUTATIONAL RESOURCE MANAGEMENT METHOD, AND COMPUTER-READABLE RECORDING MEDIUM

(71) Applicant: NEC Corporation, Tokyo (JP)

(72) Inventors: Masato Asahara, Tokyo (JP); Akihiro Yabe, Tokyo (JP); Kyota Kanno, Tokyo (JP); Ryohei Fujimaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 16/085,097

(22) PCT Filed: Apr. 27, 2017

(86) PCT No.: PCT/JP2017/016868
§ 371 (c)(1),
(2) Date: Sep. 14, 2018

(87) PCT Pub. No.: WO2017/188419
PCT Pub. Date: Nov. 2, 2017

(65) Prior Publication Data
US 2019/0079796 A1 Mar. 14, 2019

(30) Foreign Application Priority Data
Apr. 28, 2016 (JP) .............................. JP2016-090728

(51) Int. Cl.
*G06F 9/48* (2006.01)
*G06N 20/00* (2019.01)
(Continued)

(52) U.S. Cl.
CPC .......... *G06F 9/4881* (2013.01); *G06F 9/4843* (2013.01); *G06F 9/50* (2013.01);
(Continued)

(58) Field of Classification Search
None
See application file for complete search history.

(56) References Cited

U.S. PATENT DOCUMENTS

2008/0281557 A1   11/2008   Emigholz
2014/0229221 A1   8/2014   Shih et al.
(Continued)

FOREIGN PATENT DOCUMENTS

JP   H09-305556 A   11/1997
JP   H11-259433 A   9/1999
(Continued)

OTHER PUBLICATIONS

International Search Report for PCT Application No. PCT/JP2017/016868, dated Jul. 18, 2017.

*Primary Examiner* — Syed A Roni

(57) ABSTRACT

A computational resource management device uses a measured value of an execution time of data processing, a measured value of a resource amount, and a feature of input data as training data to learn a model indicating a relationship between the execution time and the resource. The device inputs, into the model, a feature of data scheduled to be input to calculate an estimated value of the execution time of the scheduled data processing, and uses the estimated value of the execution time, a variation index indicating variation in the estimated value of the execution time, and distribution of estimated residuals to calculate a resource amount required in the scheduled data processing. The device creates an execution plan of the scheduled data processing, based on the estimated value of the execution time, the variation index, the distribution of estimated residuals, and the calculated resource amount.

9 Claims, 33 Drawing Sheets

(51) Int. Cl.
   *G06F 11/34* (2006.01)
   *G06F 9/50* (2006.01)
   *G06N 5/00* (2006.01)
   *G06N 7/00* (2006.01)

(52) U.S. Cl.
   CPC .......... *G06F 9/5038* (2013.01); *G06F 9/5061* (2013.01); *G06F 11/3419* (2013.01); *G06F 11/3447* (2013.01); *G06F 11/3452* (2013.01); *G06N 5/003* (2013.01); *G06N 7/005* (2013.01); *G06N 20/00* (2019.01); *G06F 2209/503* (2013.01); *G06F 2209/5022* (2013.01)

(56) References Cited

U.S. PATENT DOCUMENTS

2016/0299785 A1* 10/2016 Anghel
2016/0380908 A1* 12/2016 Larsson

FOREIGN PATENT DOCUMENTS

| JP | 2010-519636 A | 6/2010 |
|---|---|---|
| JP | 2015-108877 A | 6/2015 |
| JP | 2016-507121 A | 3/2016 |

\* cited by examiner (a)

Completion time limit of w₄: 360 sec

Completion time limit of w₃: 240 sec (b)

Type of data processing

| w_id | Data processing type |
|------|---------------------|
| w₁   | SQL |
| w₂   | SQL |
| w₃   | Linear regression analysis |
| w₄   | Logistic regression analysis |

Fig.7

Execution result information of data processing (taking $w_1$ as an example)

| | $w_{id}$ | CPU core count | Memory (GB) | Data amount (number of records) | Execution time (sec) | CPU type |
|---|---|---|---|---|---|---|
| rec1 | $w_1$ | 8 | 2 | 1000 | 55 | Xeon E5-2640 v3 |
| rec2 | $w_1$ | 16 | 2 | 1000 | 33 | Xeon E5-2640 v3 |
| rec3 | $w_1$ | 32 | 2 | 1000 | 12 | Xeon E5-2640 v3 |
| rec4 | $w_1$ | 8 | 2 | 2000 | ∞ | Xeon E5-2640 v3 |
| rec5 | $w_1$ | 8 | 4 | 2000 | 125 | Xeon E5-2640 v3 |
| rec6 | $w_1$ | 16 | 4 | 2000 | 54 | Xeon E5-2640 v3 |
| rec7 | $w_1$ | 32 | 4 | 2000 | 33 | Xeon E5-2640 v3 |

Resource amount $r_{w1}$

Environment information $E_{w1}$

Execution time $ProcTime_{w1, rw1, Ew1}$

Fig.8 feature$_{w1}$

|  | $w_{id}$ | Data amount (number of records) | SQL | Linear regression analysis | Logistic regression analysis |
|---|---|---|---|---|---|
| rec1 | $w_1$ | 1000 | True | False | False |
| rec2 | $w_1$ | 1000 | True | False | False |
| rec3 | $w_1$ | 1000 | True | False | False |
| rec4 | $w_1$ | 2000 | True | False | False |
| rec5 | $w_1$ | 2000 | True | False | False |
| rec6 | $w_1$ | 2000 | True | False | False |
| rec7 | $w_1$ | 2000 | True | False | False |

Fig.10

Exemplary output of model learning unit (Branching condition is only $W_{id}$, and distribution of estimated residuals is assumed to be the same for all data processing w)

| $W_{id}$ | execution time estimation function |
|---|---|
| $w_1$ | $0.48(d+v)/c + e$ |
| $w_2$ | $0.24(d+v)/c + e$ |
| $w_3$ | $0.8(d+v)/c + e$ |
| $w_4$ | $2.1(d+v)/c + e$ |

- d: = data amount
- c: = CPU core count
- Variation distribution of data amount $v \sim N(1500, 150)$
- Distribution of estimated residuals $D_e \sim N(0, 4)$

Fig.12

| R | CPU core count | Memory |
|---|---|---|
| $r_1$ | 16 | 8GB |
| $r_2$ | 8 | 2GB |
| $r_3$ | 16 | 4GB |
| $r_4$ | 12 | 4GB |

Fig.13

| W | CPU core count | Memory | Execution start time |
|---|---|---|---|
| $w_1$ | 16 | 2GB | 0 sec. |
| $w_2$ | 8 | 1GB | 60 sec. |
| $w_3$ | 8 | 3GB | 60 sec. |
| $w_4$ | 16 | 4GB | 255 sec. |

Fig.14

| Estimated completion time of $w_3$ | Estimated completion time of $w_4$ |
|---:|---:|
| 210 sec. | 315 sec. |
| 215 sec. | 330 sec. |
| 195 sec. | 320 sec. |

Fig.15

|     | Noncompliance probability $p_{ri}$ |
|-----|-----|
| $w_3$ | 0% |
| $w_4$ | 0% |

Completion time limit of $w_3$: 240 sec

Completion time limit of $w_4$: 360 sec

Fig.16
|  | Noncompliance probability $p_{r2}$ | $p_{r3}$ | $p_{r4}$ |
|---|---|---|---|
| $w_2$ | 33% | 0.5% | 100% |
| $w_4$ | 42% | 0.8% | 0.1% |
  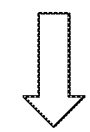
do not add　　add　　do not add

|  | $r_1$ | $r_3$ |
|---|---|---|
| obj (value of resource) | ¥ 1,000,000 | ¥ 500,000 |

Output: $r_3$
(16 CPU cores, 4GB memory)

Fig.20

| | CPU core count | Memory | Processing time | CPU type (environment information E) | Data amount (number of records) | SQL | Linear regression analysis | Logistic regression analysis |
|---|---|---|---|---|---|---|---|---|
| $w_i$ | 16 | 2GB | 45 sec. | Xeon E5-2640 v3 | 1000 | True | False | False | feature amount $feature_{w_i}$ of data processing $w_i$

Fig.21

Example of Plan$_{(W-\{w1\}), r}$

| W | CPU core count | Memory | Execution start time |
|---|---|---|---|
| $w_2$ | 8 | 1GB | 45 sec. |
| $w_3$ | 8 | 3GB | 45 sec. |
| $w_4$ | 16 | 4GB | 235 sec. |

Fig.23

Exemplary computation of execution plan Plan$_{W, r1}$ ($w_1$, $w_2$: no time limit)

|  | Estimation processing completion time | Standard deviation $\sigma_e$ of error | Standard deviation $\sigma_v$ of data amount | Completion time at which noncompliance probability becomes <1% |
|---|---|---|---|---|
| $w_3$ | 200 sec. | 4 sec. | 150 | 239 sec. |
| $w_4$ | 300 sec. | 4 sec. | 150 | 321 sec. |

Fig.28

| | CPU core count | Memory |
|---|---|---|
| r~ | 16 | 8GB |

Fig.29

Exemplary sampling results of execution plan $Plan_{w_1}$-
($w_1$, $w_1$: no time limit)

| Completion time of $w_3$ | Completion time of $w_4$ |
|---|---|
| 210 sec. | 315 sec. |
| 215 sec. | 330 sec. |
| 195 sec. | 365 sec. |

| | Noncompliance probability $p_r$ |
|---|---|
| $w_3$ | 0% |
| $w_4$ | 33% |

Completion time limit of $w_3$: 240 sec.

Completion time limit of $w_4$: 360 sec.

Output: 33%
(output largest value)

Fig.32

Exemplary computation of execution plan $Plan_{w,r^-}$ ($w_1$, $w_2$: no time limit)

|  | Estimation processing completion time | Standard deviation $\sigma_e$ of distribution of estimated residuals | Standard deviation $\sigma_v$ of distribution of statistics | Noncompliance probability $p_{w,r^-}$ |
|---|---|---|---|---|
| $w_3$ | 200 sec. | 4 sec. | 150 | 0.38% |
| $w_4$ | 300 sec. | 4 sec. | 150 | 0.07% |

COMPUTATIONAL RESOURCE MANAGEMENT DEVICE, COMPUTATIONAL RESOURCE MANAGEMENT METHOD, AND COMPUTER-READABLE RECORDING MEDIUM

This application is a National Stage Entry of PCT/JP2017/016868 filed on Apr. 27, 2017, which claims priority from Japanese Patent Application 2016-090728 filed on Apr. 28, 2016, the contents of all of which are incorporated herein by reference, in their entirety.

TECHNICAL FIELD

The present invention relates to a computational resource management device and a computational resource management method for formulating an execution plan in a system that performs data analysis, and, furthermore, relates to a computer-readable medium for realizing such a device and method.

BACKGROUND ART

Generally, data analysis involves complex processing that is constituted by execution of multiple types of data processing, such as execution of Structured Query Language (SQL) queries, data conversion, and execution of machine learning algorithms, for example. Also, since the data amount to be analyzed has increased markedly in recent years, data analysis is distributed by a computer cluster and executed in parallel. Also, updating of a forecasting model every fixed period and daily demand forecasting in a business application are given as examples of a specific application of data analysis.

Also, with such data analysis, a time limit is set for provision of analysis results, particularly when applied to business applications, thus requiring that an appropriate amount of computer resources is computed and an execution plan is set. Thus, for example, Patent Document 1 discloses a system that schedules execution of tasks during data analysis. The system disclosed by Patent Document 1 estimates the period for completing the execution of tasks for each of the computer resources, and sets an execution schedule of the tasks, based on the estimated period, such that computer costs are minimized.

LIST OF PRIOR ART DOCUMENTS

Patent Document

Patent Document 1: JP 2016-507121A

DISCLOSURE OF THE INVENTION

Problems to be Solved by the Invention

Incidentally, in data analysis, processing time may vary indeterminately due to changes in the total amount following changes in the data that is input to the system or due to changes in the input value. Furthermore, depending on the machine learning algorithm, processing time may also vary indeterminately, due to factors such as the initial value dependence of the algorithm. Accordingly, in order to appropriately set the execution plan, indeterminate variation in processing time needs to be taken into consideration. However, with the system disclosed in Patent Document 1, no consideration whatsoever is given to indeterminate variation in processing time, and thus there will conceivably be cases where an execution plan cannot be appropriately set.

One example of an object of the present invention is to resolve the above problems and provide a computational resource management device, a computational resource management method and a computer-readable recording medium that can formulate an execution plan in data analysis with consideration for indeterminate variation in processing time.

Means for Solving the Problems

In order to achieve the above object, a first computational resource management device in an aspect of the present invention is a device for managing a system that performs data processing, including:

a model learning unit configured to use a measured value of an execution time of data processing, a measured value of a resource amount allocated to the data processing, and a feature of input data to the data processing as training data to learn a model indicating a relationship between the execution time and the resource;

an execution time estimation unit configured to input a feature of data scheduled to be input to data processing scheduled to be executed into the model to calculate an estimated value of the execution time of the scheduled data processing;

a resource amount calculation unit configured to use the estimated value of the execution time, a variation index indicating variation in the estimated value of the execution time that depends on change in a feature of data input in past data processing, and distribution of estimated residuals obtained during learning of the model to calculate a resource amount required in the scheduled data processing; and an execution plan creation unit configured to create an execution plan of the scheduled data processing, based on the estimated value of the execution time, the variation index, the distribution of estimated residuals, and the calculated resource amount.

In order to achieve the above object, a second computational resource management device in an aspect of the present invention is a device for managing a system that performs data processing, including:

a model learning unit configured to use a measured value of an execution time of data processing, a measured value of a resource amount allocated to the data processing, and a feature of input data to the data processing as training data to learn a model indicating a relationship between the execution time and the resource;

an execution time estimation unit configured to input a feature of data scheduled to be input to data processing scheduled to be executed into the model to calculate an estimated value of the execution time;

an execution plan creation unit configured to create an execution plan of the scheduled data processing, in a range of the resource amount designated in advance; and a noncompliance probability calculation unit configured to calculate a probability of the scheduled data processing not complying with a completion time limit, from the estimated value of the execution time, a variation index of the execution time that depends on change in a feature of data input in past data processing, distribution of estimated residuals obtained during learning of the model, and the created execution plan.

Also, in order to achieve the above object, a first computational resource management method in an aspect of the present invention is a method for managing a system that performs data processing, including:

(a) a step of using a measured value of an execution time of data processing, a measured value of a resource amount allocated to the data processing, and a feature of input data to the data processing as training data to learn a model indicating a relationship between the execution time and the resource;

(b) a step of inputting a feature of data scheduled to be input to data processing scheduled to be executed into the model to calculate an estimated value of the execution time of the scheduled data processing;

(c) a step of using the estimated value of the execution time, a variation index indicating variation in the estimated value of the execution time that depends on change in a feature of data input in past data processing, and distribution of estimated residuals obtained during learning of the model to calculate a resource amount required in the scheduled data processing; and (d) a step of creating an execution plan of the scheduled data processing, based on the estimated value of the execution time, the variation index, the distribution of estimated residuals, and the calculated resource amount.

Also, in order to achieve the above object, a second computational resource management method in an aspect of the present invention is a method for managing a system that performs data processing, including:

(a) a step of using a measured value of an execution time of data processing, a measured value of a resource amount allocated to the data processing, and a feature of input data to the data processing as training data to learn a model indicating a relationship between the execution time and the resource;

(b) a step of inputting a feature of data scheduled to be input to data processing scheduled to be executed into the model to calculate an estimated value of the execution time;

(c) a step of creating an execution plan of the scheduled data processing, in a range of the resource amount designated in advance; and (d) a step of calculating a probability of the scheduled data processing not complying with a completion time limit, from the estimated value of the execution time, a variation index of the execution time that depends on change in a feature of data input in past data processing, distribution of estimated residuals obtained during learning of the model, and the created execution plan.

Furthermore, in order to achieve the above object, a first computer-readable recording medium in an aspect of the present invention is a computer-readable recording medium on which is recorded a computer program for managing, by computer, a system that performs data processing, the computer program including a command for causing the computer to execute:

(a) a step of using a measured value of an execution time of data processing, a measured value of a resource amount allocated to the data processing, and a feature of input data to the data processing as training data to learn a model indicating a relationship between the execution time and the resource;

(b) a step of inputting a feature of data scheduled to be input to data processing scheduled to be executed into the model to calculate an estimated value of the execution time of the scheduled data processing;

(c) a step of using the estimated value of the execution time, a variation index indicating variation in the estimated value of the execution time that depends on change in a feature of data input in past data processing, and distribution of estimated residuals obtained during learning of the model to calculate a resource amount required in the scheduled data processing; and (d) a step of creating an execution plan of the scheduled data processing, based on the estimated value of the execution time, the variation index, the distribution of estimated residuals, and the calculated resource amount.

Furthermore, in order to achieve the above object, a second computer-readable recording medium in an aspect of the present invention is a computer-readable recording medium on which is recorded a computer program for managing, by computer, a system that performs data processing, the computer program including a command for causing the computer to execute:

(a) a step of using a measured value of an execution time of data processing, a measured value of a resource amount allocated to the data processing, and a feature of input data to the data processing as training data to learn a model indicating a relationship between the execution time and the resource;

(b) a step of inputting a feature of data scheduled to be input to data processing scheduled to be executed into the model to calculate an estimated value of the execution time;

(c) a step of creating an execution plan of the scheduled data processing, in a range of the resource amount designated in advance; and (d) a step of calculating a probability of the scheduled data processing not complying with a completion time limit, from the estimated value of the execution time, a variation index of the execution time that depends on change in a feature of data input in past data processing, distribution of estimated residuals obtained during learning of the model, and the created execution plan.

Advantageous Effects of the Invention

As described above, according to the present invention, an execution plan in data analysis can be formulated with consideration for indeterminate variation in processing time.

BRIEF DESCRIPTION OF THE DRAWINGS

FIG. 7 is a diagram showing an example of execution result information of data processing that is used in learning an estimation model.

FIG. 8 is a diagram showing an example of a feature of input data that is used in learning an estimation model.

FIG. 10 is a diagram showing an example of an estimation model.

FIG. 12 is a diagram showing an example of a candidate set of a resource amount.

FIG. 13 is a diagram showing an example of an execution plan that is input to a resource amount calculation unit.

FIG. 14 is a diagram showing an example of sampling in an execution plan.

FIG. 15 is a diagram showing an example of a calculated noncompliance probability.

FIG. 16 is a diagram showing a relationship between noncompliance probability and threshold.

FIG. 20 is a diagram showing an example of data that is input to a model learning unit from a data processing system.

FIG. 21 is a diagram showing an example of a new execution plan that is acquired at the time of execution of a data processing set.

FIG. 23 is a diagram showing an example of the result of calculating the completion time by the resource amount calculation unit.

FIG. 28 is a diagram showing an example of a resource amount designated by a user.

FIG. 29 is a diagram showing an example of the result of calculating estimated execution times of respective data processing.

FIG. 32 is a diagram showing another example of the result of calculating the completion time limit noncompliance probability.

MODES FOR CARRYING OUT THE INVENTION

First Embodiment

Hereinafter, a computational resource management device, a computational resource management method and a computer program in a first embodiment of the present invention will be described, with reference to FIGS. 1 to 22.

Device Configuration

Figure 1:
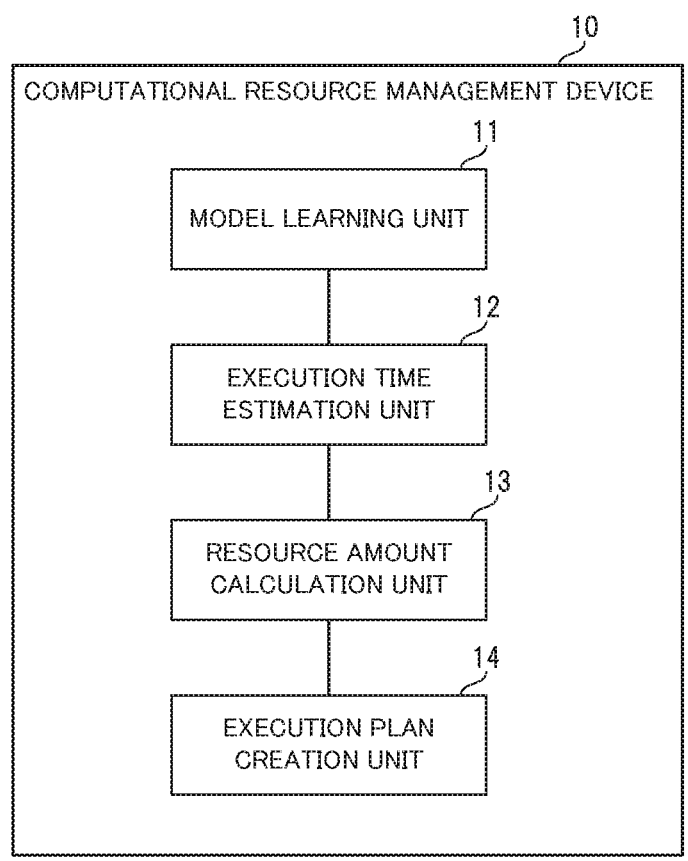
FIG. 1 is a block diagram showing the schematic configuration of a computational resource management device in a first embodiment of the present invention.

Initially, a schematic configuration of the computational resource management device in the first embodiment will be described, using FIG. 1. FIG. 1 is a block diagram showing the schematic configuration of the computational resource management device in the first embodiment of the present invention.

A computational resource management device 10 in the first embodiment shown in FIG. 1 is a device for managing a system that performs data processing. As shown in FIG. 1, the computational resource management device 10 is provided with a model learning unit 11, an execution time estimation unit 12, a resource amount calculation unit 13, and an execution plan creation unit 14.

The model learning unit 11 learns an estimation model indicating a relationship between execution time and resource, using a measured value of the execution time of data processing, a measured value of the resource amount allocated to data processing and a feature of input data as training data.

The execution time estimation unit 12 inputs a feature of data that is scheduled to be input to data processing that is scheduled to be executed into the estimation model to calculate an estimated value of the execution time of the scheduled data processing.

The resource amount calculation unit 13 calculates the resource amount that is required in the scheduled data processing, using the estimated value of execution time, a variation index indicating the variation in the estimated value of execution time that depends on change in a feature of data input in past data processing, and the distribution of estimated residuals that are obtained when learning the estimation model.

The execution plan creation unit 14 creates an execution plan of the scheduled data processing, based on the estimated value of execution time, the variation index, the distribution of estimated residuals, and the calculated resource amount.

In this way, in the first embodiment, a variation index indicating the variation in the estimated value of execution time that depends on change in a feature of data input in past data processing and the distribution of estimated residuals that are obtained when learning an estimation model are used, when calculating the resource amount that is required in the scheduled data processing. The variation index and the distribution of estimated residuals are data that reflect indeterminate variation in the data analysis and the machine learning algorithm. That is, change in the processing time due to variation in the data amount is reflected in the variation index, and random change in the processing time is reflected in the estimated residuals. Thus, according to the first embodiment, an execution plan in data analysis can be formulated with consideration for indeterminate variation in the processing time.

Figure 2:
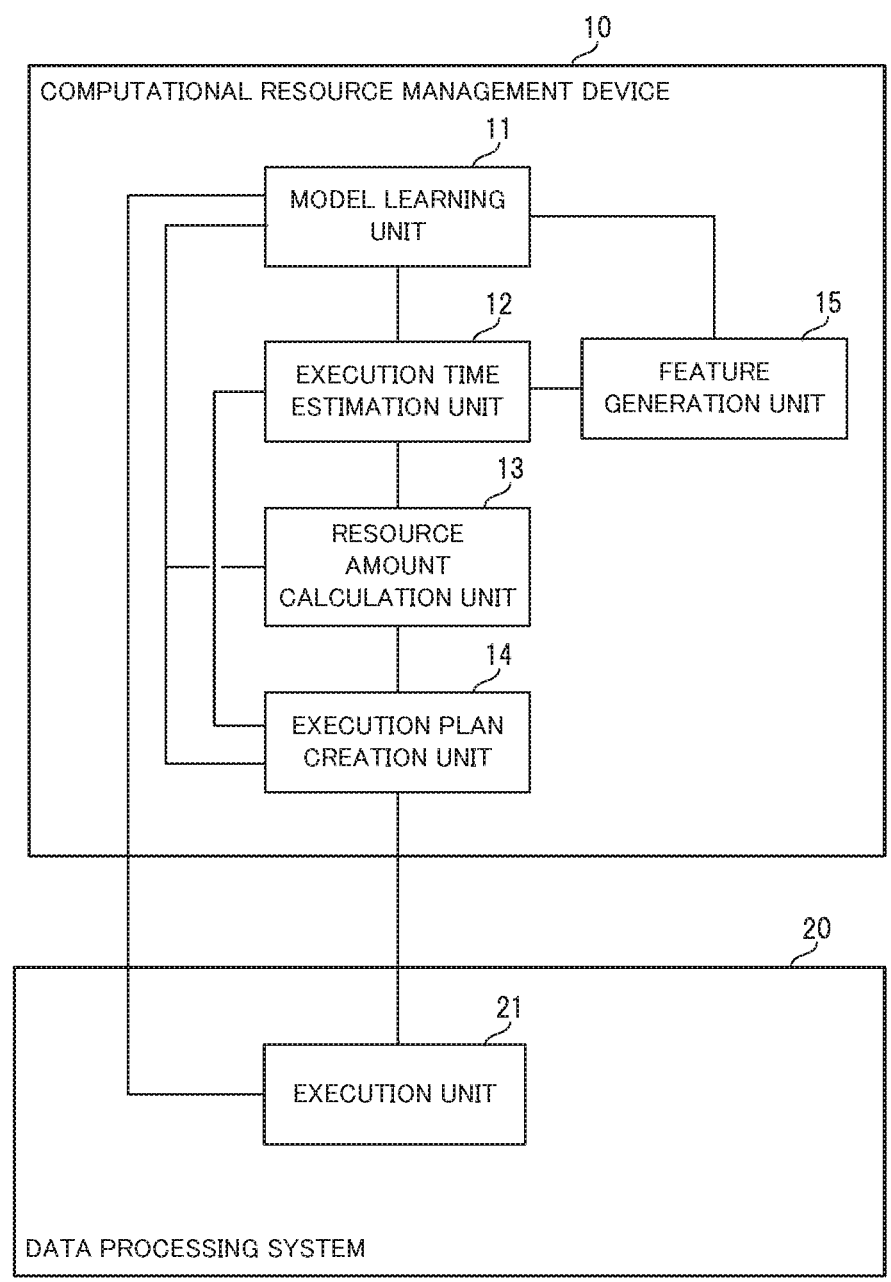
FIG. 2 is a block diagram showing a specific configuration of the computational resource management device in the first embodiment of the present invention.
Figure 3:
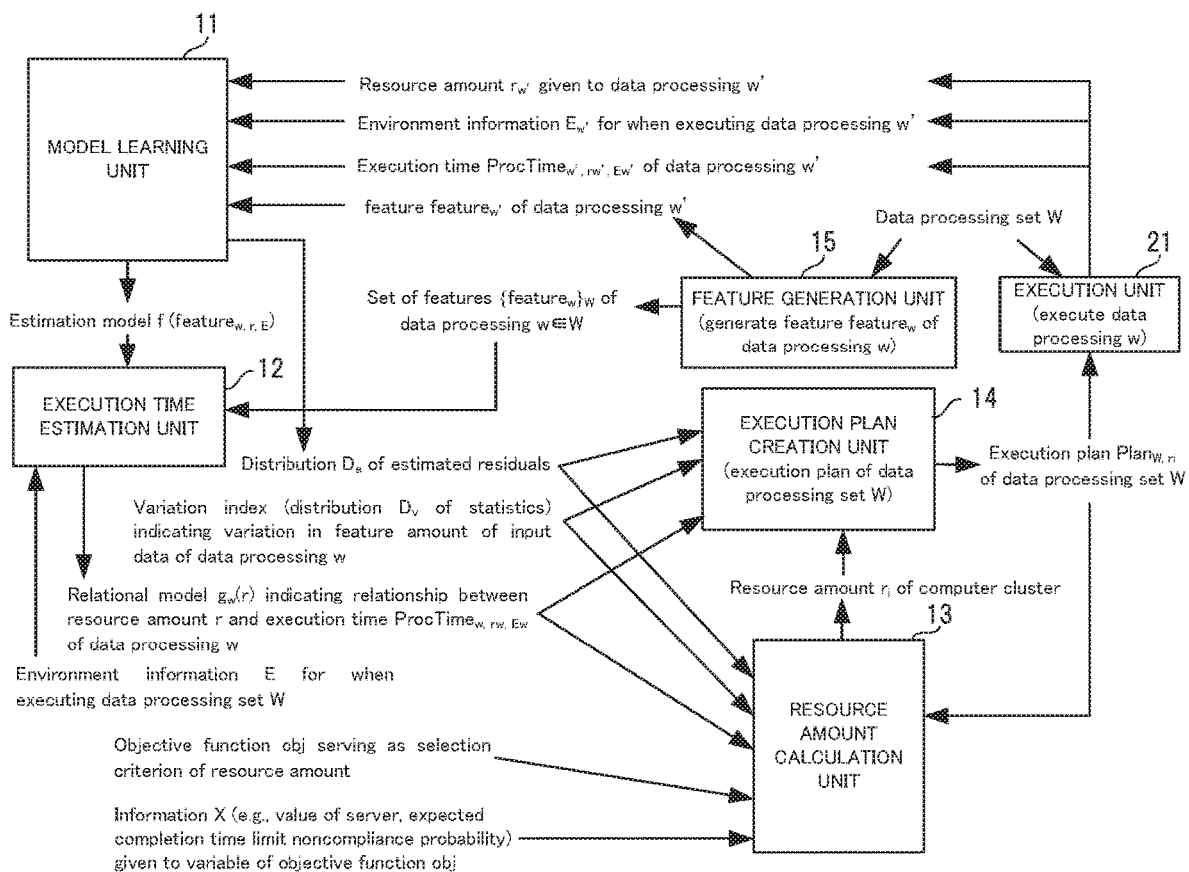
FIG. 3 is a diagram showing the dataflow in the computational resource management device in the first embodiment of the present invention.

Here, the configuration of the computational resource management device 10 in the first embodiment will be more specifically described, using FIGS. 2 and 3. FIG. 2 is a block diagram showing a specific configuration of the computational resource management device in the first embodiment of the present invention. FIG. 3 is a diagram showing the dataflow in the computational resource management device in the first embodiment of the present invention.

As shown in FIG. 2, in the first embodiment, the computational resource management device 10 is connected to a data processing system 20 that executes data processing. The data processing system 20 is provided with an execution unit 21 that executes data processing.

Also, as shown in FIG. 2, the computational resource management device 10 is also provided with a feature generation unit 15 that generates a feature of the data processing, in addition to the model learning unit 11, the execution time estimation unit 12, the resource amount calculation unit 13 and the execution plan creation unit 14.

In the present embodiment, as shown in FIG. 3, the feature generation unit 15, upon a data processing set W constituted by data processing $w_1$-$w_n$ being input, generates a set of features $\{feature_w\}_W$ of data processing w∈W, and inputs the generated set of features to the execution time estimation unit 12. Also, the feature $feature_w$ of the various data processing w is included in the set of features $\{feature_w\}_W$ of the data processing w∈W, and, furthermore, the feature of input data to the data processing w is included in the feature $feature_w$ of the various data processing w. Furthermore, the feature generation unit 15, upon data processing w' that has already been executed by the execution unit 21 being input, generates a feature $feature_{w'}$ of the data processing w', and inputs the generated feature to the model learning unit 11.

Also, in the present embodiment, as shown in FIG. 3, information including a resource amount $r_{w'}$ given to the data processing w' that has already been executed, environment information $E_{w'}$ that specifies the environment at the time of execution of the data processing w' and $ProcTime_{w', rw', Ew'}$ of the execution time (measured value) of the data processing w' is input to the model learning unit 11 from the execution unit 21. Furthermore, as described above, the feature $feature_{w'}$ of the data processing w' is also input to the model learning unit 11 from the feature generation unit 15.

The model learning unit 11 executes a machine learning algorithm using the abovementioned data that is input, and learns an estimation function f that provides an execution time (estimated value) $ProcTime_{w, rw, Ew}$ of the data processing w as an estimation model. Also, the model learning unit 11, when learning the estimation function, also generates a distribution $D_e$ of estimated residuals. Note that an existing algorithm can be used as the machine learning algorithm.

Furthermore, the model learning unit 11 is able to specify a variation in the estimated value of execution time that depends on change in a feature of data input in past data processing w', and is also able to generate a variation index indicating the specified change. Note that, in the first embodiment, the model learning unit 11 generates, as the variation index, a distribution $D_v$ of statistics relating to change in the feature of input data, for example. Also, in the first embodiment, the distribution $D_v$ of statistics may be generated by the feature generation unit 15.

The execution time estimation unit 12, in the first embodiment, acquires environment information E that specifies the environment at the time of executing the data processing set W and the feature $feature_w$ input from the feature generation unit 15, and inputs the acquired data to the estimation function f. The execution time estimation unit 12 thereby creates a relational model $g_w(r)$ indicating the relationship between the resource amount r and the execution time $ProcTime_{w, rw, Ew}$ of the scheduled data processing w. Also, the execution time estimation unit 12 inputs the relational model $g_w(r)$ to the resource amount calculation unit 13 and the execution plan creation unit 14.

The resource amount calculation unit 13, in the first embodiment, acquires a distribution $D_e$ of estimated residuals from the model learning unit 11, and acquires the relational model $g_w(r)$ from the execution time estimation unit 12 as the estimated value of execution time. The resource amount calculation unit 13 also acquires the distribution $D_v$ of statistics relating to change in the feature of input data, an objective function obj that serves as a criterion for selecting the resource amount, and information X that is given to a variable of the objective function obj.

The resource amount calculation unit 13 calculates a resource amount $r_i$ that is required in the scheduled data processing w (data processing set W), using the acquired data, and inputs the calculated resource amount $r_i$ to the execution plan creation unit 14.

The execution plan creation unit 14, in the first embodiment, acquires the resource amount $r_i$ from the resource amount calculation unit 13, acquires the distribution $D_e$ of estimated residuals from the model learning unit 11, and acquires the relational model $g_w(r)$ from the execution time estimation unit 12 as the estimated value of execution time. The execution plan creation unit 14 also acquires the distribution $D_v$ of statistics relating to change in the feature of input data.

The execution plan creation unit 14 executes a scheduling algorithm using the acquired data, and creates an execution plan $Plan_{W, ri}$ of the scheduled data processing set W. Also, the execution plan creation unit 14, in the first embodiment, first inputs the execution plan $Plan_{W, ri}$ to the resource amount calculation unit 13. Note that an existing algorithm can be used as the scheduling algorithm.

The resource amount calculation unit 13 thereby calculates a completion time limit noncompliance probability $p_{ri}$ in the case where data processing is performed according to the input execution plan $Plan_{W, ri}$, and determines whether the completion time limit noncompliance probability $p_{ri}$ is smaller than a threshold p. If a result of the determination indicates that the completion time limit noncompliance probability $p_{ri}$ is smaller than the threshold p, the resource amount calculation unit 13 then adds the previously calculated resource amount $r_i$ to a resource amount adoption candidate list $L_R$. Also, the threshold p of the completion time limit noncompliance probability is designated by the user.

When creation of the resource amount adoption candidate list $L_R$ by the resource amount calculation unit 13 has ended, the execution plan creation unit 14 creates a final execution plan $Plan_W$, using the resource amount adoption candidate list $L_R$, and transmits the created execution plan to the execution unit 21.

Device Operations

Next, operations of the computational resource management device 10 in the first embodiment of the present invention will be described using FIGS. 4 to 23. Also, in the first embodiment, a computational resource management method is implemented by operating the computational resource management device 10. Therefore, description of the computational resource management method in the first embodiment is replaced by the following description of the operations of the computational resource management device 10.

Figure 4:
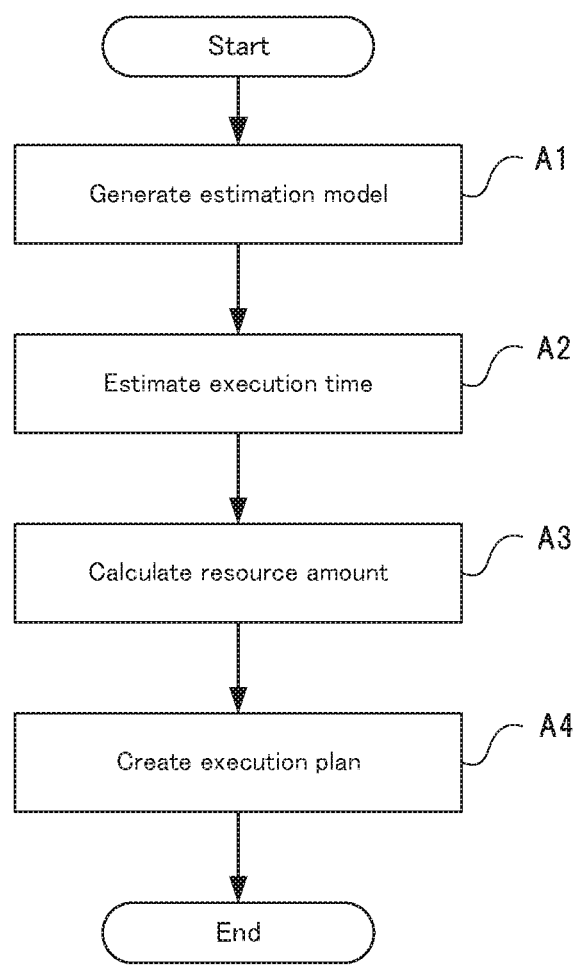
FIG. 4 is a flow diagram showing operations of the computational resource management device in the first embodiment of the present invention.

Initially, an outline of the overall operations of the computational resource management device 10 will be described, using FIG. 4. FIG. 4 is a flow diagram showing operations of the computational resource management device in the first embodiment of the present invention.

Initially, the model learning unit 11 learns an estimation model indicating the relationship between execution time and resource, using the measured value of the execution time of the data processing, the measured value of the resource amount allocated to the data processing and the feature of the input data to the data processing as training data (step A1).

Next, the execution time estimation unit 12 inputs the feature of scheduled data to be input to the scheduled data processing into the estimation model to calculate the estimated value of execution time of the scheduled data processing (step A2).

Next, the resource amount calculation unit 13 calculates the resource amount that is required in the scheduled data processing, using the estimated value of execution time, a variation index indicating a variation in the estimated value of execution time that depends on change in a feature of data input in past data processing, and the distribution of estimated residuals that are obtained when learning an estimation model (step A3).

Next, the execution plan creation unit 14 creates an execution plan of the scheduled data processing, based on the estimated value of execution time, the variation index, the distribution of estimated residuals, and the calculated resource amount (step A4).

After execution of step A4, the execution plan creation unit 14 transmits the created execution plan to the data processing system 20. In the data processing system 20, the execution unit 21 thereby executes data processing in line with the execution plan.

Figure 5:
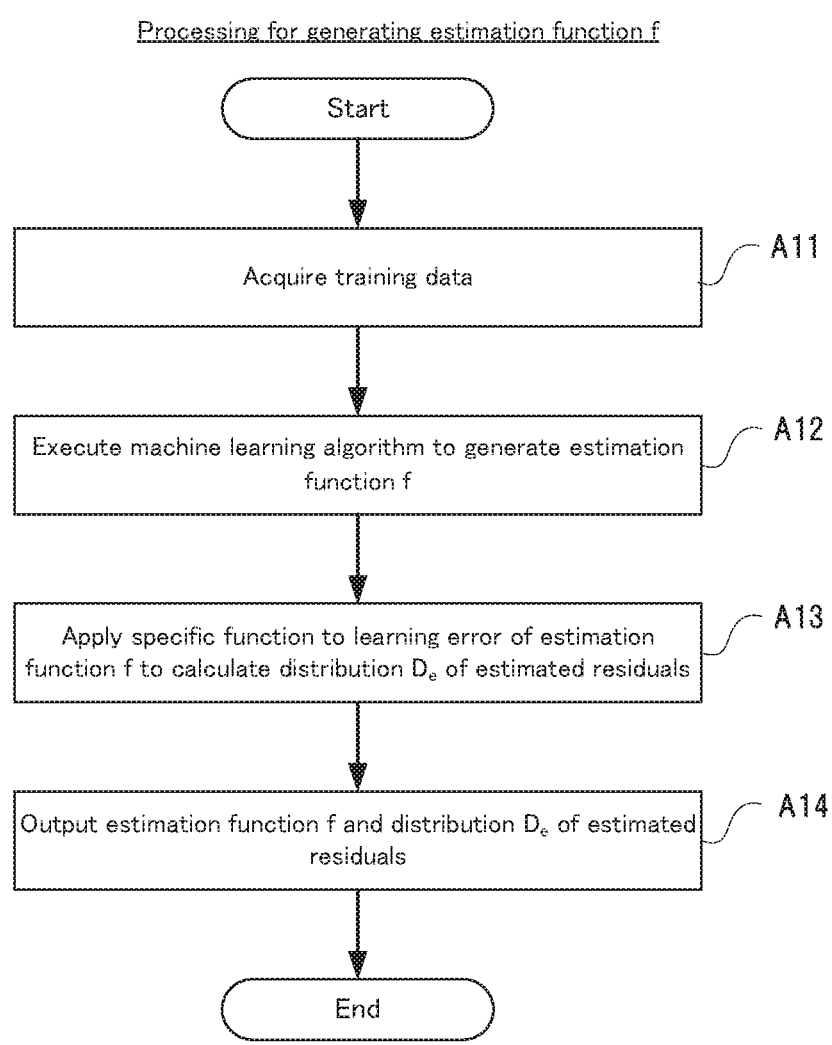
FIG. 5 is a flow diagram showing, in detail, processing for generating an estimation model in step A1 shown in FIG. 4.
Figure 6:
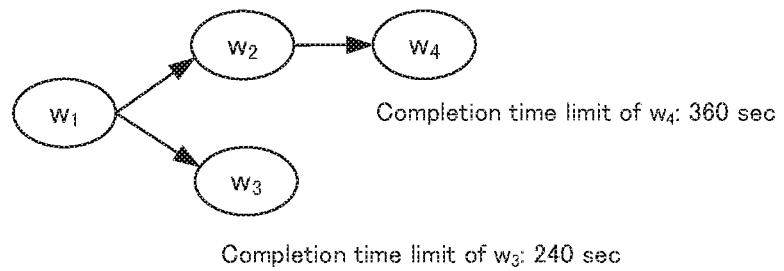
FIG. 6 are diagrams showing an example of a data processing set to be processed, with FIG. 6(a) showing the dependency relationship and completion time limits of various data processing, and FIG. 6(b) showing the types of data processing.

Next, the processing (step A1) in the model learning unit 11 shown in FIG. 4 will be described in detail, using FIGS. 5 to 10. FIG. 5 is a flow diagram showing, in detail, generation processing of the estimation model in step A1 shown in FIG. 4. FIG. 6 are diagrams showing an example of a data processing set to be processed, with FIG. 6(a) showing the dependency relationship and completion time limits of various data processing, and FIG. 6(b) showing the types of data processing.

Figure 9:
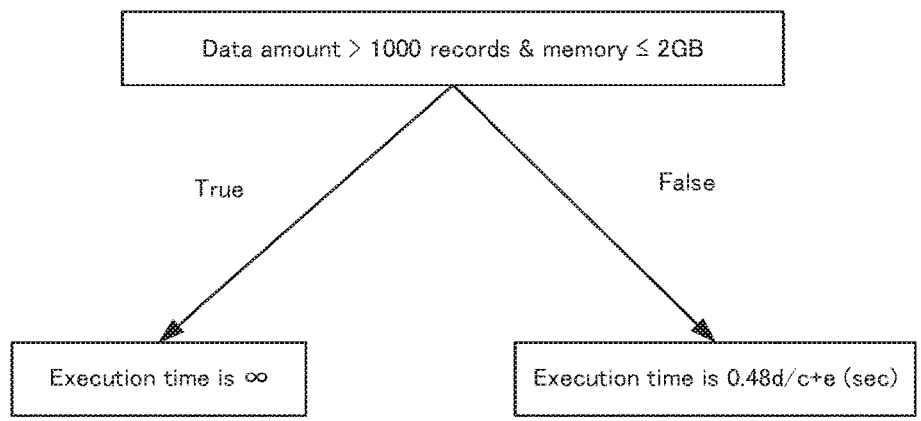
FIG. 9 is a diagram illustrating an outline of an estimation model.

FIG. 7 is a diagram showing an example of execution result information of data processing that is used in learning the estimation model. FIG. 8 is a diagram showing an example of a feature of the input data that is used in learning the estimation model. FIG. 9 is a diagram illustrating an outline of the estimation model. FIG. 10 is a diagram showing an example of the estimation model.

Initially, as shown in FIG. 5, the model learning unit 11 acquires training data (step A11). In step A11, the training data is the resource amount $r_{w'}$ given to the executed data processing w', the environment information $E_{w'}$ at the time of execution of the data processing w', the execution time $ProcTime_{w', rw', Ew}$ of the data processing w', and the feature $feature_{w'}$ of the data processing w'.

Specifically, in the first embodiment, as shown in FIGS. 6 (a) and (b), the data processing set W that is to undergo data processing is constituted from by $w_1$, $w_2$, $w_3$ and $w_4$. Because the information acquired when the data processing set W was executed previously is stored, as shown in FIG. 7, as the execution result information of previous data processing, the model learning unit 11 acquires this execution result information as training data. Note that, in FIG. 7, only the execution result information of data processing $w_1$ is illustrated.

Also, because the feature generation unit 15 generates the feature $feature_w$ shown in FIG. 8 from the type and execution result of data processing, the model learning unit 11 also acquires the generated feature $feature_w$ as learning data. Note that, in FIG. 8, only a feature $feature_{w1}$ generated from the type and execution result of the data processing $w_1$ is illustrated.

Next, the model learning unit 11 executes the machine learning algorithm, and generates the estimation function f (step A12). Specifically, the model learning unit 11 learns the decision tree shown in FIG. 9, for example, from the execution result information and the $feature_w$, and creates an estimation function f. An example of the estimation function f is as shown in FIG. 10.

Also, the machine learning algorithm that can be used in the first embodiment is not particularly limited. A heterogeneous learning algorithm and an algorithm using a linear regression equation, for example, are given as machine learning algorithms that can be used in the first embodiment.

Next, the model learning unit 11 applying a specific function to a learning error of the estimation function f to calculate the distribution $D_e$ of estimated residuals (step A13). Note that, a derivation function of sample variation or unbiased variation and a derivation function of standard deviation are given as specific functions.

Thereafter, the model learning unit 11 outputs the estimation function f to the execution time estimation unit 12, and outputs the distribution $D_e$ of estimated residuals to the resource amount calculation unit 13 and the execution plan creation unit 14 (step A14).

Also, when step A14 is executed, the execution time estimation unit 12 executes the abovementioned step A2. Specifically, the execution time estimation unit 12 inputs the environment information E that specifies the environment at the time of executing the data processing set W and the feature $feature_w$ input from the feature generation unit 15 into the estimation function f. The execution time estimation unit 12 thereby creates the relational model $g_w(r)$ indicating the relationship between the resource amount r and the execution time $ProcTime_{w, rw, Ew}$ of the scheduled data processing w.

Figure 11:
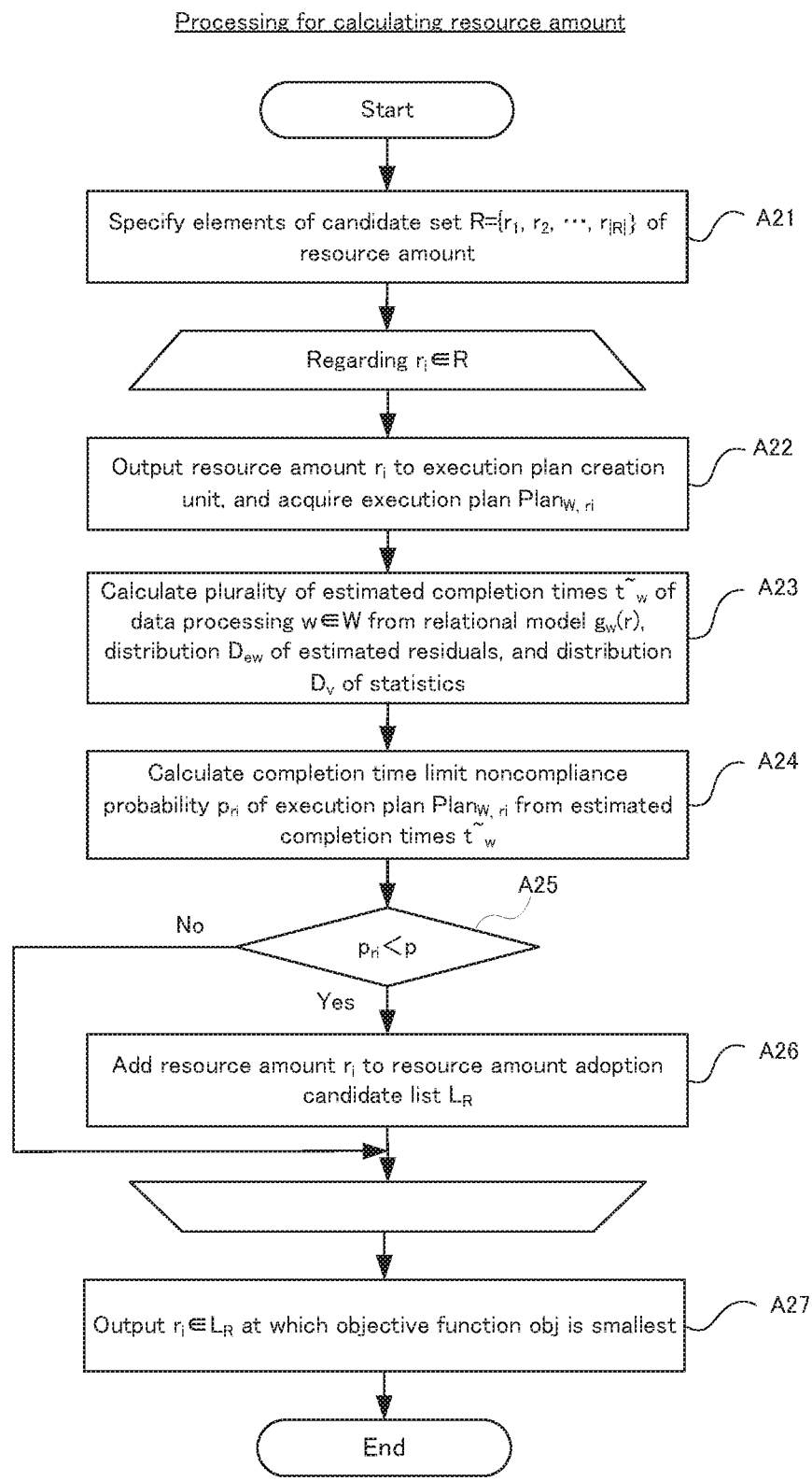
FIG. 11 is a flow diagram showing, in detail, processing for calculating a resource amount in step A3 shown in FIG. 4.
Figure 17:
FIG. 17 is a diagram showing an example of the result of calculating a final resource amount.

Next, the processing (step A3) in the resource amount calculation unit 13 shown in FIG. 4 will be described in detail using FIGS. 11 to 17. FIG. 11 is a flow diagram showing, in detail, processing for calculating the resource amount in step A3 shown in FIG. 4. FIG. 12 is a diagram showing an example of a candidate set of resource amounts. FIG. 13 is a diagram showing an example of an execution plan that is input to the resource amount calculation unit. FIG. 14 is a diagram showing an example of sampling in the execution plan. FIG. 15 is a diagram showing an example of the calculated noncompliance probability. FIG. 16 is a diagram showing a relationship between noncompliance probability and threshold. FIG. 17 is a diagram showing an example of a result of calculating the final resource amount.

As shown in FIG. 11, initially, the resource amount calculation unit 13 specifies the elements of a candidate set $R=\{r_1, r_2, \ldots, r_{|R|}\}$ of the resource amount (step A21). Specifically, as shown in FIG. 12, in the candidate set $R=\{r_1, r_2, \ldots, r_{|R|}\}$ of the resource amount, each candidate $r_1$ is constituted by the CPU core count and the memory capacity.

Next, the resource amount calculation unit 13 executes steps A22 to A26 for every candidate $r_i$ of the resource amount. Specifically, the resource amount calculation unit 13 outputs a candidate $r_i$ of the resource amount to the execution plan creation unit 14, and, acquires the execution plan $Plan_{W, ri}$ from the execution plan creation unit 14 (step A22). As shown in FIG. 13, the acquired execution plan Plan$_{W, ri}$ is formulated by the CPU core count, the memory capacity and the execution start time for every data processing.

Next, the resource amount calculation unit 13 calculates a plurality of estimated completion times t˜$_w$ of the data processing w∈W, from the relational model g$_{w(r)}$, the distribution D$_{ew}$ of estimated residuals of the estimation function f, and the distribution D$_v$ of statistics relating to input data (step A23). In the example of FIG. 14, the estimated completion times t˜$_w$ calculated for data processing w$_3$ and w$_4$ are illustrated.

Next, the resource amount calculation unit 13 calculates the completion time limit noncompliance probability p$_{ri}$ of the execution plan Plan$_{W, ri}$ from the estimated completion times t˜$_w$ (step A24). In the example of FIG. 15, the completion time limit noncompliance probabilities p$_{ri}$ calculated for data processing w$_3$ and w$_4$ is illustrated.

Next, the resource amount calculation unit 13 determines whether the completion time limit noncompliance probability p$_{ri}$ calculated in step A24 are smaller than the threshold p (step A25).

If the result of the determination of step A25 indicates that the completion time limit noncompliance probability p$_{ri}$ calculated in step A24 is smaller than the threshold p, the resource amount calculation unit 13 adds a candidate r$_i$ of the resource amount to the resource amount adoption candidate list L$_R$ (step A26). In the example of FIG. 16, the case where the candidate r$_i$ of the resource amount is added to the resource amount adoption candidate list L$_R$ and the case where the candidate r$_i$ is not added are illustrated.

If the result of the determination of step A25 indicates that the completion time limit noncompliance probability p$_{ri}$ calculated in step A24 is not smaller than the threshold p, the resource amount calculation unit 13 returns to step A22, given that processing has not ended for all of the candidates.

If steps A22 to A26 have ended for all the candidates r$_i$ of the resource amount, the resource amount calculation unit 13 outputs a candidate r$_i$∈L$_R$ of the resource amount at which the objective function obj is smallest to the execution plan creation unit 14 (step A27). In the example of FIG. 17, a candidate r$_3$ of the resource amount is output to the execution plan creation unit 14.

Figure 18:
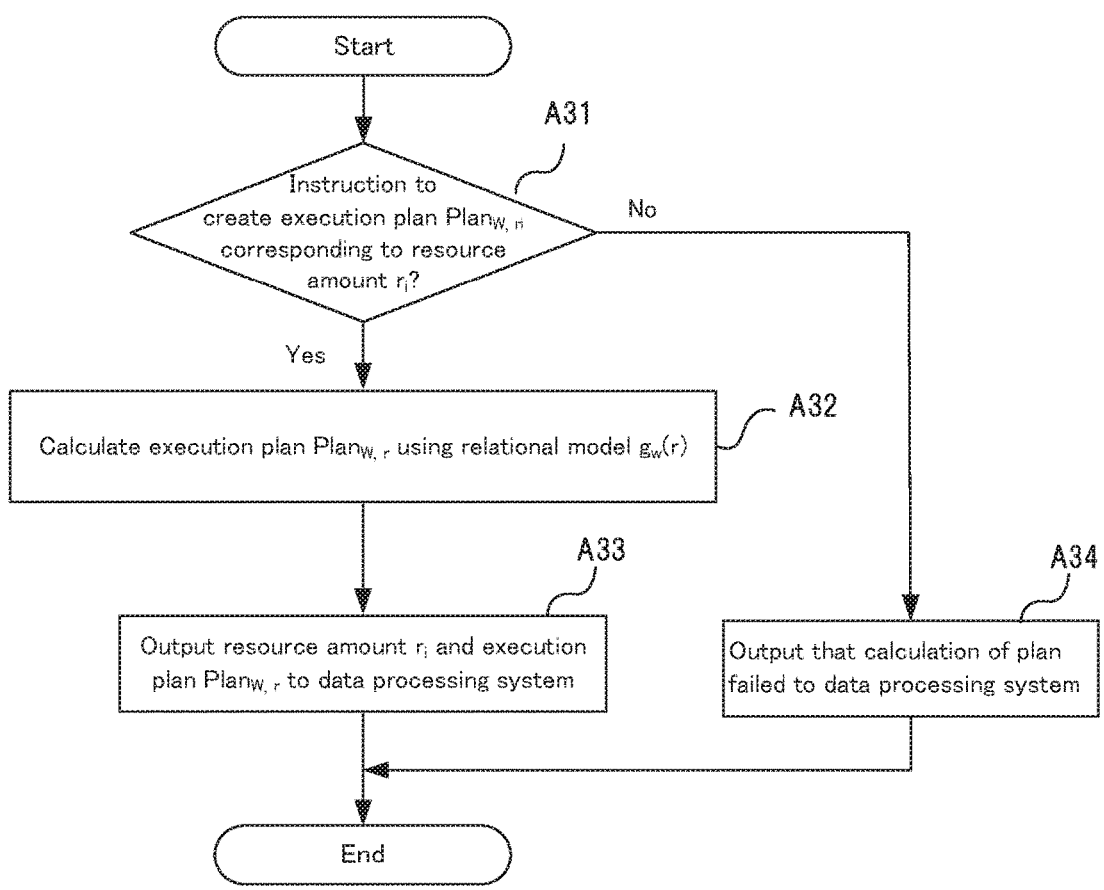
FIG. 18 is a flow diagram showing, in detail, creation processing of an execution plan in step A4 shown in FIG. 4.

Next, the processing (step A4) in the execution plan creation unit 14 shown in FIG. 4 will be described in detail using FIG. 18. FIG. 18 is a flow diagram showing, in detail, creation processing of the execution plan in step A4 shown in FIG. 4.

First, as the abovementioned step A27, the resource amount calculation unit 13 instructs the execution plan creation unit 14 to create an execution plan, in the case where there exists a resource amount r$_i$ capable of creating the execution plan Plan$_{W, ri}$.

Accordingly, as shown in FIG. 18, initially, the execution plan creation unit 14 determines whether there is an instruction to create the execution plan Plan$_{W, ri}$ corresponding to the resource amount r$_i$ from the resource amount calculation unit 13 (step A31).

If the result of step A31 indicates that there is an instruction to create the execution plan Plan$_{W, ri}$, the execution plan creation unit 14 executes the scheduling algorithm, and calculates the execution plan Plan$_{W, r}$ using the relational model g$_w$(r) (step A32).

Next, after execution of step A32, the execution plan creation unit 14, in response to the instruction from the resource amount calculation unit 13, outputs the selected resource amount r$_i$, and the execution plan Plan$_{W, r}$ corresponding thereto (refer to FIG. 13) to the execution unit 21 of the data processing system 20 (step A33).

On the other hand, if the result of the determination of step A31 indicates that there is no instruction to create the execution plan Plan$_{W, ri}$ the execution plan creation unit 14 outputs the fact that calculation of a plan failed to the execution unit 21 of the data processing system (step A34). Specifically, in this case, the resource amount calculation unit 13 judges that a resource amount r$_i$ capable of creating the execution plan Plan$_{W, ri}$ does not exist, and instructs the execution plan creation unit 14 to output plan calculation failure.

Note that, as described above, the execution plan creation unit 14 also creates an execution plan in step A22 shown in FIG. 11. However, in this case, the execution plan creation unit 14 executes only the abovementioned step A32, and outputs the created execution plan to the resource amount calculation unit 13.

Figure 19:
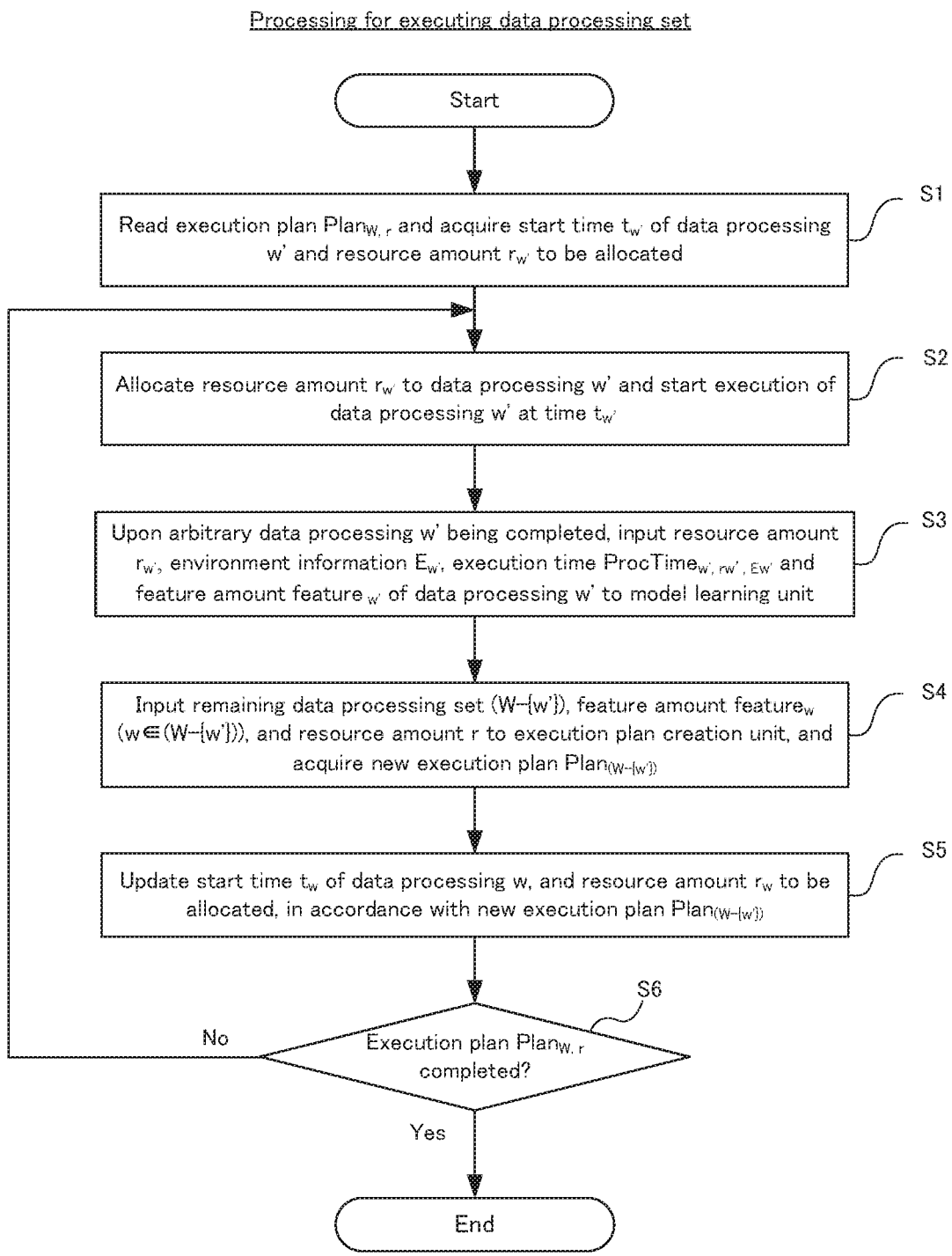
FIG. 19 is a flow diagram showing operations that are performed by a data processing system in an embodiment of the present invention.

Here, operations of the execution unit 21 in the data processing system 20 will be described using FIGS. 19 to 21. FIG. 19 is a flow diagram showing the operations that are performed with the data processing system in the embodiment of the present invention. FIG. 20 is a diagram showing an example of data that is input to the model learning unit from the data processing system. FIG. 21 is a diagram showing an example of a new execution plan that is acquired at the execution time of the data processing set.

As shown in FIG. 19, initially, in the data processing system 20, the execution unit 21, read the execution plan Plan$_{W, r}$ transmitted from the computational resource management device 10, and acquires a start time t$_{w'}$ of the data processing w', which is ∈W', and the resource amount r$_{w'}$ to be allocated (step S1). Note that the execution plan that is loaded in step S1 is assumed to be the execution plan shown in FIG. 13.

Next, the execution unit 21, upon arrival of time t$_{w'}$, allocates the resource amount r$_{w'}$ to the data processing w' and starts execution of the data processing (step S2).

Next, the execution unit 21, upon arbitrary data processing w' being completed, inputs the resource amount r$_{w'}$, the environment information E$_{w'}$, the execution time ProcTime$_{w', rw', Ew'}$ and the feature amount feature$_{w'}$ of the data processing$_{w'}$ to the model learning unit 11 (step S3). In step S3, an example of data that is input to the model learning unit 11 is as shown in FIG. 20. FIG. 20 shows the data that is input to the model learning unit 11 at the end of the data processing w$_1$.

Upon step S3 being executed, the execution plan creation unit 14 will obtain a new estimation function f', the distribution D$_e$ of estimated residuals, and the distribution D$_v$ of statistics relating to variation in the feature amount of the input data of the data processing w.

Next, the execution unit 21 inputs the remaining data processing set (W−{w'}), the feature amount feature$_w$ (w∈ (W−{w'})), and the resource amount r to the execution plan creation unit 14 to create a new execution plan Plan$_{(W−\{w'\})}$, and acquire the new execution plan (step S4). As a result of step S4, as shown in FIG. 21, the execution plan Plan$_{(W−\{w'\})}$ is updated from the execution plan read in step S1.

Next, the execution unit 21 updates the start time t$_w$ of the data processing w, and the resource amount r$_w$ to be allocated, in accordance with the new execution plan Plan$_{(W−\{w'\})}$ (step S5).

Next, after execution of step S5, the execution unit 21 determines whether the execution plan Plan$_{W, r}$ has been Completed (Step S6). If the Result of the Determination of step S6 indicates that the execution plan Plan$_{W, r}$ has not been completed, the execution unit 21 executes step S2 again. On the other hand, if the result of the determination of step S6 indicates that the execution plan $Plan_{W,r}$ has been completed, the execution unit 21 ends the processing. In this way, the execution unit 21 executes data processing, while updating the execution plan such that the execution rate per unit of time does not decrease.

As described above, in the first embodiment, the resource amount calculation unit 13 calculates the resource amount from the relational model $g_w(r)$ indicating the relationship between the resource amount r and the execution time $ProcTime_{w,rw,Ew}$ of the scheduled data processing w, the distribution $D_e$ of estimated residuals, and the distribution $D_v$ of statistics relating to change in the feature of input data. Accordingly, the first embodiment, as described above, enables an execution plan in data analysis to be formulated with consideration for indeterminate variation in the processing time.

Computer Program

The computer program in the first embodiment need only be a program that causes a computer to execute steps A1 to A4 shown in FIG. 4. The computational resource management device 10 and the computational resource management method in the first embodiment can be realized, by installing this program in a computer and executing the installed program. In this case, a CPU (Central Processing Unit) of the computer performs processing, functioning as the model learning unit 11, the execution time estimation unit 12, the resource amount calculation unit 13 and the execution plan creation unit 14.

Also, the program in the first embodiment may be executed by a computer system constructed by a plurality of computers. In this case, for example, each computer may function as one of the model learning unit 11, the execution time estimation unit 12, the resource amount calculation unit 13 and the execution plan creation unit 14.

Variation

Figure 22:
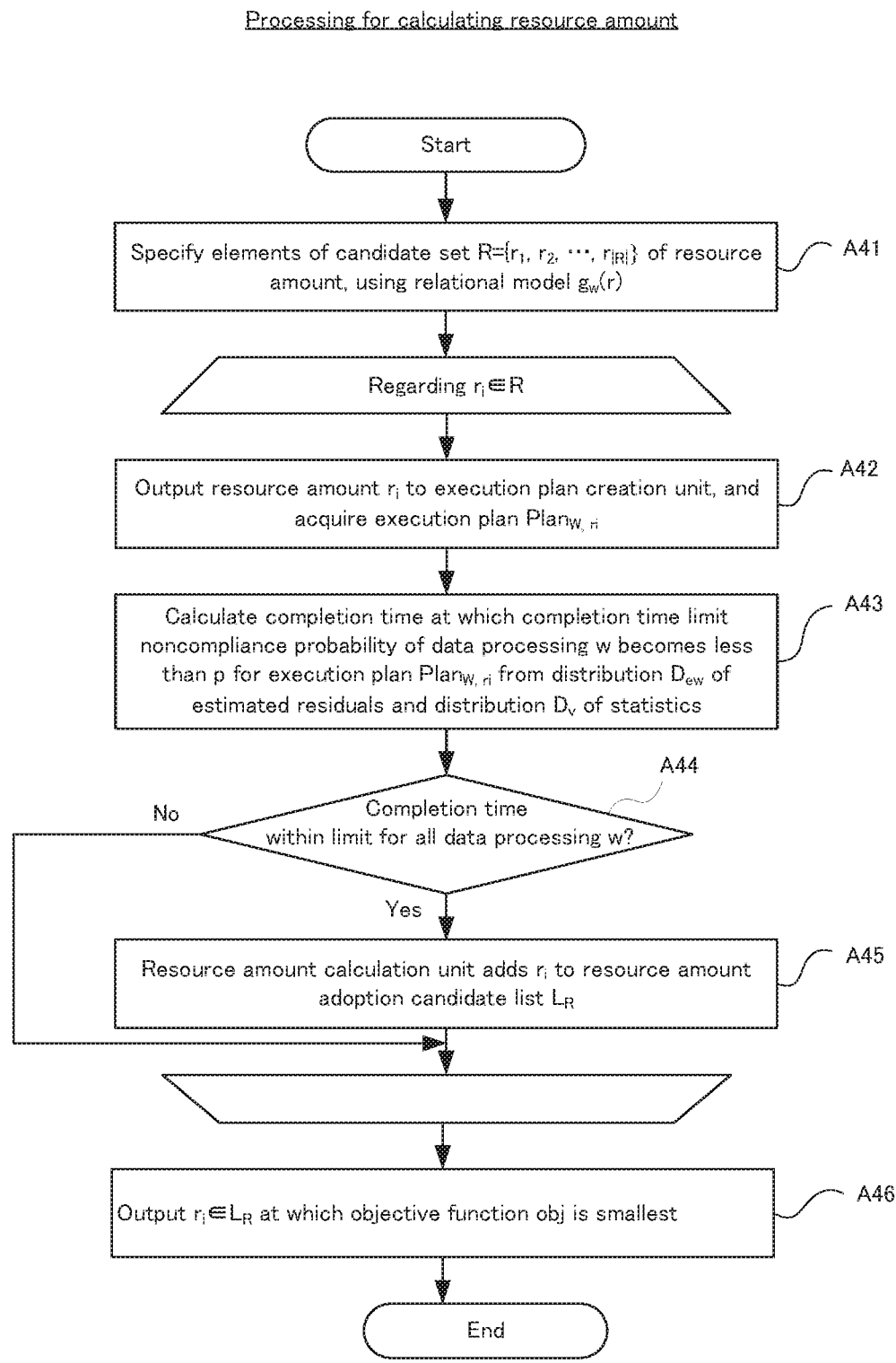
FIG. 22 is a flow diagram showing, in detail, another example of processing for calculating a resource amount in step A3 shown in FIG. 4.

Here, a variation in the first embodiment will be described. In this variation, processing in the resource amount calculation unit 13 differs from the example shown in FIG. 11. Hereinafter, differences will be described using FIGS. 22 and 23. FIG. 22 is a flow diagram showing, in detail, another example of processing for calculating a resource amount in step A3 shown in FIG. 4. FIG. 23 is a diagram showing an example of the result of calculating the completion time by the resource amount calculation unit.

As shown in FIG. 22, initially, the resource amount calculation unit 13 specifies elements of the candidate set $R=\{r_1 r_2, \ldots, r_{|R|}\}$ of the resource amount (step A41). Note that step A41 is a similar step to step A21 shown in FIG. 11.

Next, the resource amount calculation unit 13 executes steps A42 to A45 for every candidate $r_i$ of the resource amount. Specifically, the resource amount calculation unit 13 outputs candidate $r_i$ of the resource amount to the execution plan creation unit 14, and acquires the execution plan $Plan_{W,ri}$ from the execution plan creation unit 14 (step A22). Note that step A42 is a similar step to step A22 shown in FIG. 11.

Next, the resource amount calculation unit 13 calculates, from the distribution $D_{ew}$ of estimated residuals of the data processing w and the distribution Dv of statistics relating to the feature amount of input data, the completion time at which the completion time limit noncompliance probability thereof becomes less than the threshold p, in the case where the data processing w is executed in line with the execution plan $Plan_{W,ri}$ (step A43). The calculation result is as shown in FIG. 23. In the example of FIG. 23, the resource amount calculation unit 13 takes the distribution $D_{ew}$ of estimated residuals and the distribution $D_v$ of statistics to be normal distributions, and assesses the probability of estimated processing time being greater than or equal to 2.33σ as being less than or equal to 1% (=p).

Next, the resource amount calculation unit 13 determines whether the completion time is within the limit for all data processing w (step A44). If the result of the determination of step A44 indicates that the completion time is within the limit for all data processing w, the resource amount calculation unit 13 adds the candidate $r_i$ of the resource amount to the resource amount adoption candidate list $L_R$ (step A45). Note that step A45 is a similar step to step A26 shown in FIG. 11.

On the other hand, if the result of the determination of step A44 indicates that the completion time is not within the limit for all data processing w, the resource amount calculation unit 13 returns to step A42, given that processing has not ended for all candidates.

If steps A42 to A45 have ended for all candidates $r_i$ of the resource amount, the resource amount calculation unit 13 outputs the candidate $r_i \in L_R$ of the resource amount at which the objective function obj is smallest to the execution plan creation unit 14 (step A46). Note that step A46 is a similar step to step A27 shown in FIG. 11.

In this way, in the variation, unlike the example in which the sampling shown in FIG. 11, the resource amount is derived from the distribution $D_{ew}$ of estimated residuals of the data processing w and the distribution $D_v$ of statistics relating to the feature amount of input data. Thus, according to this variation, the processing load can be reduced and shortening of the time taken to calculate the resource amount can be achieved.

Second Embodiment

Next, a computational resource management device, a computational resource management method and a computer program in a second embodiment of the present invention will be described, with reference to FIGS. 24 to 32.

Device Configuration

Figure 24:
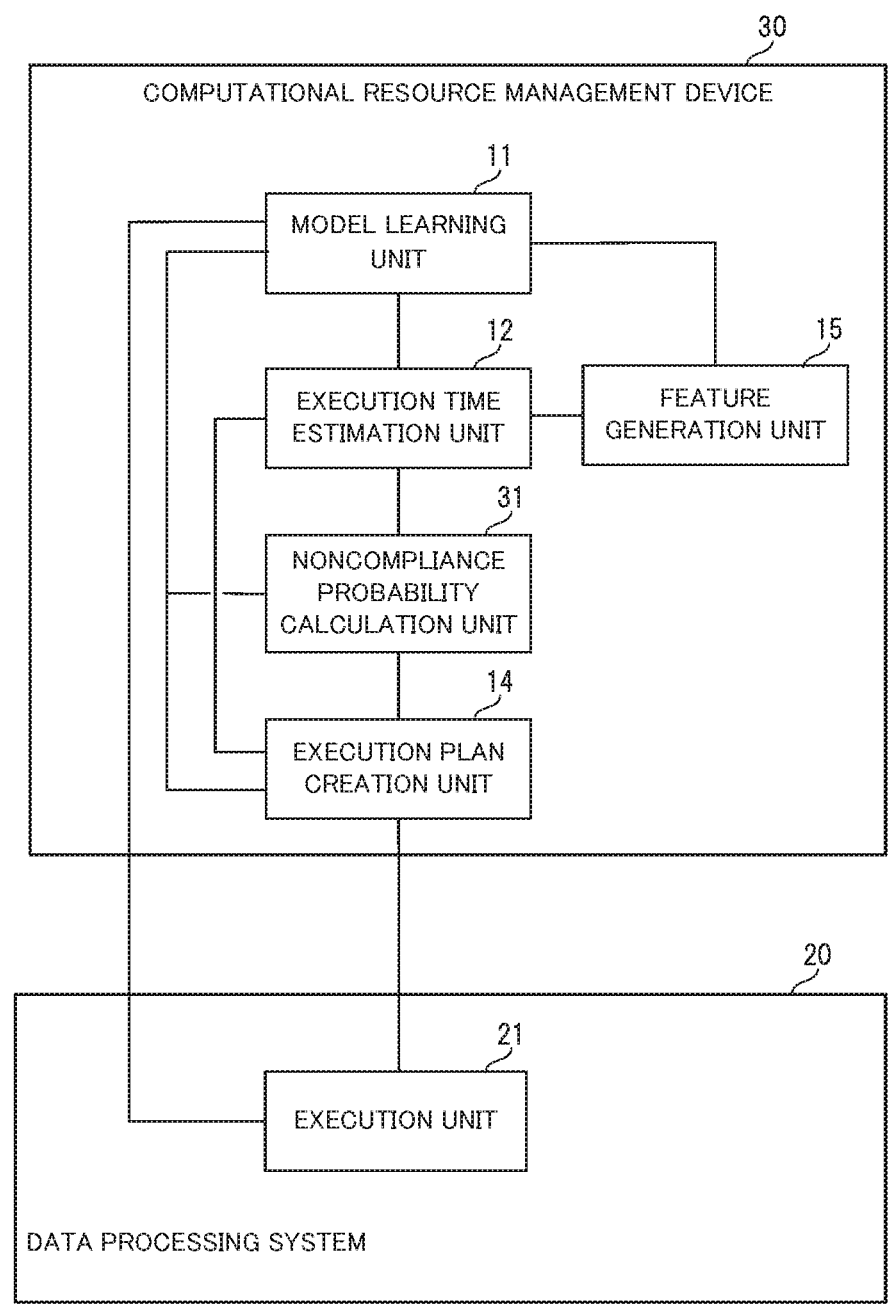
FIG. 24 is a block diagram showing a specific configuration of a computational resource management device in a second embodiment of the present invention.
Figure 25:
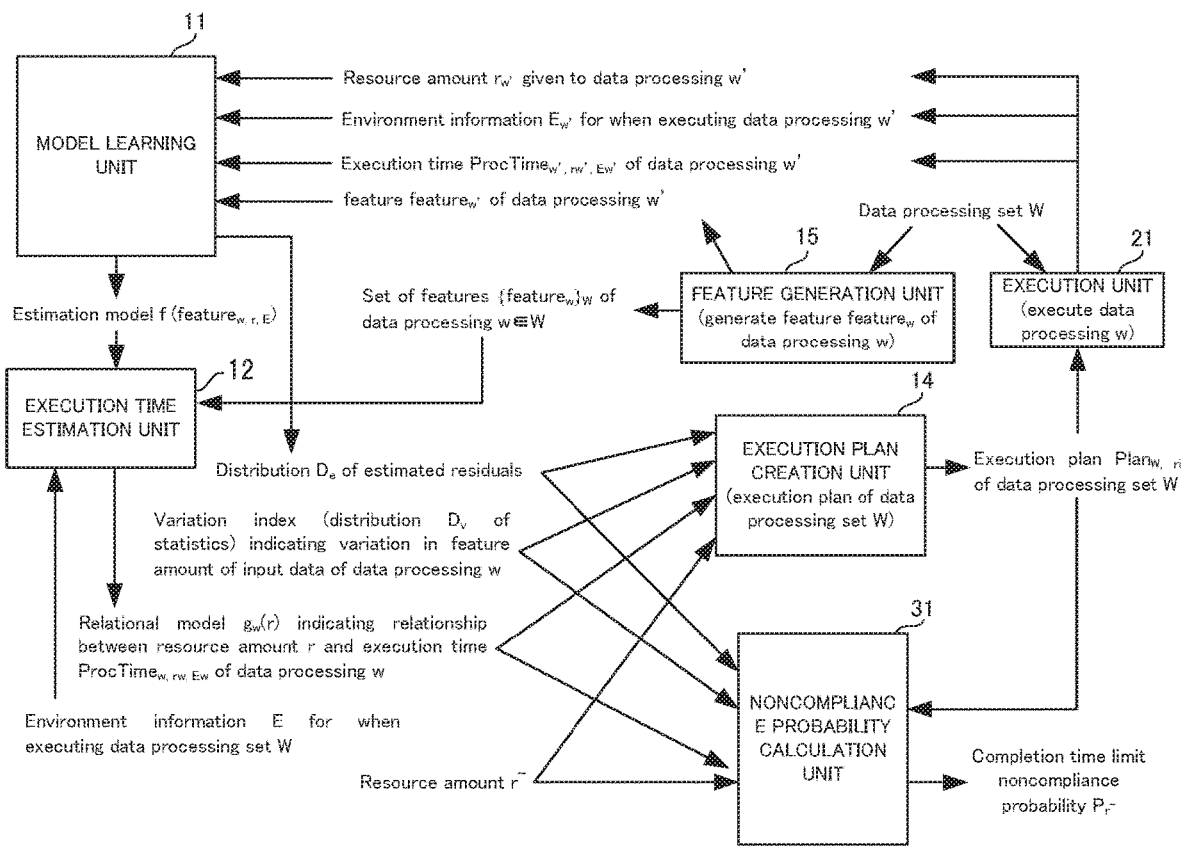
FIG. 25 is a diagram showing the dataflow in the computational resource management device in the second embodiment of the present invention.

Initially, the configuration of the computational resource management device in the second embodiment will be described, using FIGS. 24 and 25. FIG. 24 is a block diagram showing a specific configuration of the computational resource management device in the second embodiment of the present invention. FIG. 25 is a diagram showing the dataflow in the computational resource management device in the second embodiment of the present invention.

As shown in FIG. 24, the computational resource management device 30 in the second embodiment is, unlike the computational resource management device 10 in the first embodiment shown in FIG. 2, provided with a noncompliance probability calculation unit 31 instead of the resource amount calculation unit 13. Note that the model learning unit 11 and the execution time estimation unit 12 are similar to the first embodiment. Hereinafter, the description will focus on the difference with the first embodiment.

The execution plan creation unit 14, in the second embodiment, creates an execution plan of the scheduled data processing, in a range of the resource amount designated in advance by the user.

Specifically, the execution plan creation unit 14 acquires a resource amount $r$ designated by the user, acquires the distribution $D_e$ of estimated residuals from the model learning unit 11, and, acquires the relational model $g_w(r)$ from the execution time estimation unit 12. The execution plan creation unit 14 also acquires the distribution $D_v$ of statistics relating to change in the feature of input data.

The execution plan creation unit 14 executes the scheduling algorithm using the acquired data, creates an execution plan $Plan_{W, \tilde{r}}$ of the scheduled data processing set W, and inputs the created execution plan to the noncompliance probability calculation unit 31. Note that an existing algorithm can be used as the scheduling algorithm.

The noncompliance probability calculation unit 31 calculates a probability (completion time limit noncompliance probability) that data processing that is scheduled to be executed will not comply with a completion time limit, from an estimated value of execution time, a variation index of execution time that depends on the change in the feature of data input in past data processing, the distribution of estimated residuals that are obtained when learning an estimation model, and the created execution plan.

Specifically, the noncompliance probability calculation unit 31 acquires the distribution $D_e$ of estimated residuals from the model learning unit 11. Also, the noncompliance probability calculation unit 31 acquires a relational model $g_w(r)$ from the execution time estimation unit 12 as the estimated value of execution time. Also, the resource amount calculation unit 13 acquires the distribution $D_v$ of statistics relating to change in the feature of input data as the variation index. Furthermore, the noncompliance probability calculation unit 31 also acquires a resource amount $\tilde{r}$ designated by the user.

The noncompliance probability calculation unit 31 calculates an estimated execution time $\tilde{t}_w$ of data processing w∈W from an estimation function f, the distribution $D_e$ of estimated residuals and the distribution $D_v$ of statistics that are acquired. The noncompliance probability calculation unit 31 then calculates a completion time limit noncompliance probability $p_{\tilde{r}}$, by collating the calculated estimated execution time $\tilde{t}_w$ with the execution plan $Plan_{W, \tilde{r}}$.

Device Operations

Next, operations of the computational resource management device 30 in the second embodiment of the present invention will be described using FIGS. 26 to 31. Also, in the second embodiment, a computational resource management method is implemented by operating the computational resource management device 30. Therefore, description of the computational resource management method in the second embodiment is replaced with the following description of the operations of the computational resource management device 30.

Figure 26:
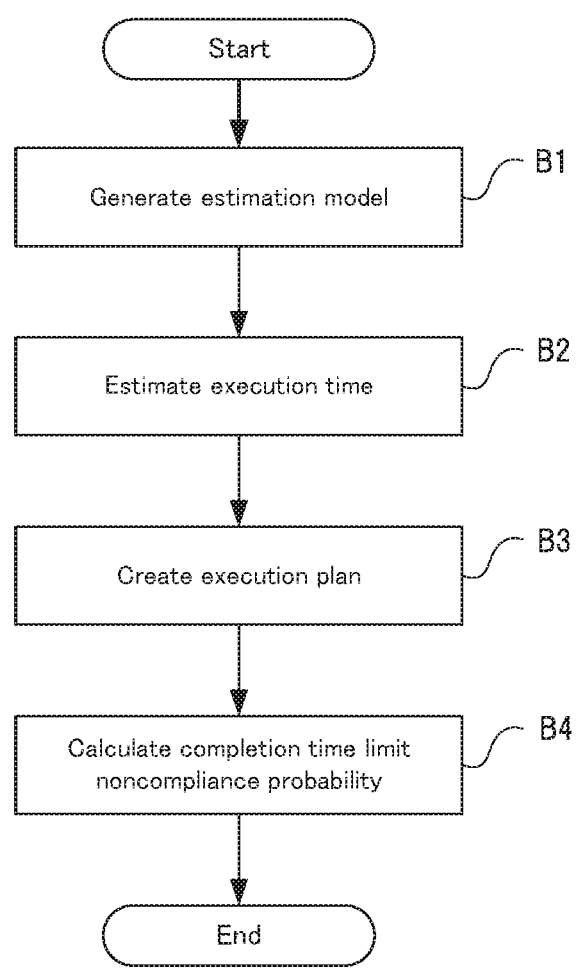
FIG. 26 is a flow diagram showing operations of the computational resource management device in the second embodiment of the present invention.

Initially, an outline of the overall operations of the computational resource management device 30 will be described, using FIG. 26. FIG. 26 is a flow diagram showing operations of the computational resource management device in the second embodiment of the present invention.

Initially, the model learning unit 11 learns an estimation model indicating the relationship between execution time and resource, using the measured value of the execution time of data processing, the measured value of the resource amount allocated to data processing, and the feature of the input data to the data processing as training data (step B1). Step B1 is a similar step to step A1 shown in FIG. 4.

Next, the execution time estimation unit 12 inputs the feature of the data that is scheduled to be input to the scheduled data processing into the estimation model to calculate the estimated value of execution time of the scheduled data processing (step B2). Step B2 is a similar step to step A2 shown in FIG. 4.

Next, the execution plan creation unit 14 creates an execution plan of the scheduled data processing in the range of the resource amount designated in advance by the user (step B3).

Next, the noncompliance probability calculation unit 31 calculates the completion time limit noncompliance probability of the scheduled data processing, from the estimated value of execution time, a variation index of execution time that depends on the change in the feature of data input to past data processing, the distribution of estimated residuals that are obtained when learning of a model, and the created execution plan (step B4).

After execution of step B4, the noncompliance probability calculation unit 31 presents the completion time limit noncompliance probability to the user. Also, the execution plan creation unit 14 transmits the created execution plan to the data processing system 20. In the data processing system 20, the execution unit 21 thereby executes data processing in line with the execution plan.

Figure 27:
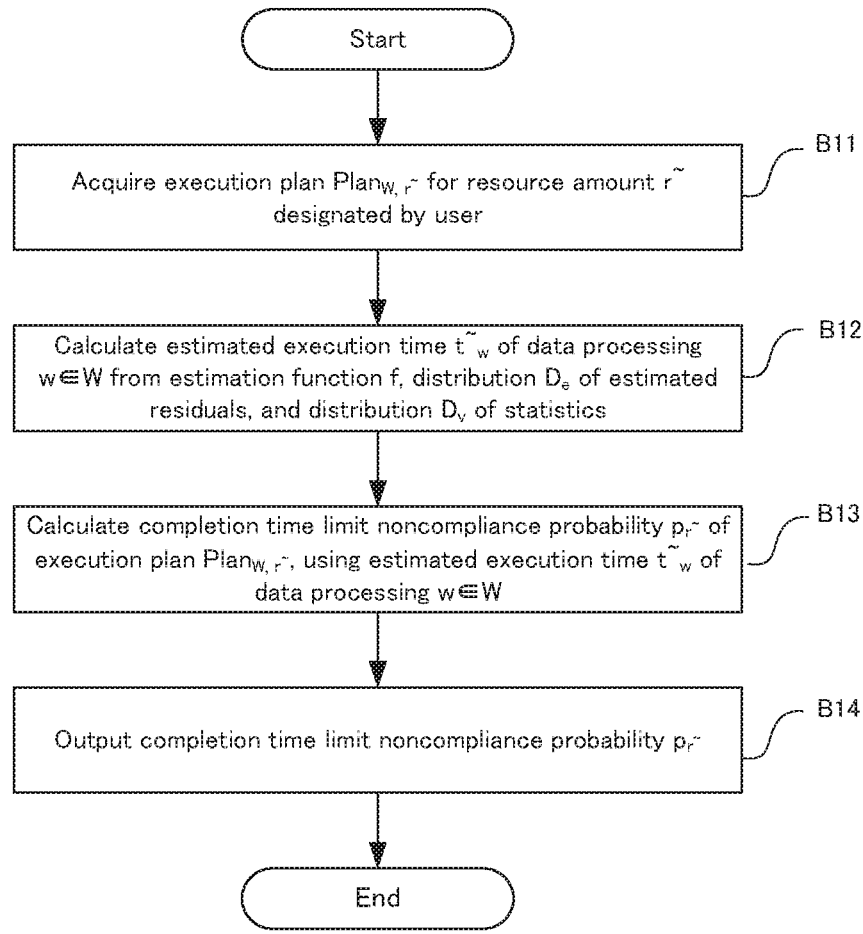
FIG. 27 is a flow diagram showing, in detail, processing for calculating a completion time limit noncompliance probability in step B4 shown in FIG. 26.
Figure 28:
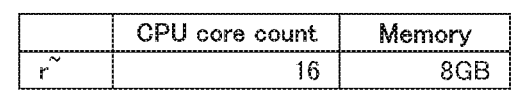
Figure 30:
FIG. 30 is a diagram showing an example of the result of calculating the completion time limit noncompliance probability.

Next, the processing (step B4) in the noncompliance probability calculation unit 31 shown in FIG. 26 will be described in detail, using FIGS. 27 to 31. FIG. 27 is a flow diagram showing, in detail, processing for calculating the completion time limit noncompliance probability in step B4 shown in FIG. 26. FIG. 28 is a diagram showing an example of a resource amount designated by the user. FIG. 29 is a diagram showing an example of the result of calculating the estimated execution times of various data processing. FIG. 30 is a diagram showing an example of the result of calculating the completion time limit noncompliance probability.

Initially, as shown in FIG. 27, the noncompliance probability calculation unit 31 acquires the execution plan $Plan_{W, \tilde{r}}$ for the Resource Amount $\tilde{r}$ Designated by the user, from the execution plan creation unit 14 (step B11). Specifically, as shown in FIG. 28, in the second embodiment, the CPU core count and the memory capacity are designated as the resource amount $\tilde{r}$. Note that the execution plan $Plan_{W, \tilde{r}}$, in the second embodiment, is formulated with the CPU core count, the memory capacity and the execution start time for every data processing (refer to FIG. 13).

Next, the noncompliance probability calculation unit 31 calculates the estimated execution time $\tilde{t}_w$ of the data processing w∈W, using the estimation function f, the distribution $D_e$ of estimated residuals, and the distribution $D_v$ of statistics (step B12). Specifically, as shown in FIG. 29, the noncompliance probability calculation unit 31 calculates a plurality of estimated execution times $\tilde{t}_w$ for every data processing w. Note that, in the example of FIG. 29, since the completion time limit is not set for the respective data processing $w_1$ and $w_2$, an estimated execution time is not calculated.

Next, the noncompliance probability calculation unit 31 calculates the completion time limit noncompliance probability $p_{\tilde{r}}$ of the execution plan $Plan_{W, \tilde{r}}$, using the estimated execution time $\tilde{t}_w$ of the data processing w∈W calculated in step B12 (step B13). The result is as shown in FIG. 30.

Next, the noncompliance probability calculation unit 31 outputs the completion time limit noncompliance probability $p_{\tilde{r}}$ to a terminal device of the user (step B14). Specifically, as shown in FIG. 30, in the second embodiment, only the largest value of the completion time limit noncompliance probability is output.

As described above, in the first embodiment, the resource amount is calculated so as to satisfy the completion time limit noncompliance probability that is designated by the user, whereas the second embodiment differs from the first embodiment in that the completion time limit noncompliance probability is calculated with respect to the resource amount that is designated by the user. Thus, the user is able to set the resource amount to be allocated to the data processing, while viewing the state of the completion time limit noncompliance probability. Also, because the distribution $D_e$ of estimated residuals and the distribution $D_v$ of statistics are used in calculating the completion time limit noncompliance probability, the execution plan in data analysis will also be similarly formulated with consideration for indeterminate variation in the processing time in the second embodiment.

Computer Program

The computer program in the second embodiment need only be a program that causes a computer to execute steps B1 to B4 shown in FIG. 26. The computational resource management device 30 and the computational resource management method in the second embodiment can be realized, by installing this program in a computer and executing the installed program. In this case, a CPU (Central Processing Unit) of the computer performs processing, functioning as the model learning unit 11, the execution time estimation unit 12, the execution plan creation unit 14 and the noncompliance probability calculation unit 31.

Also, the program in the second embodiment may be executed by a computer system constructed by a plurality of computers. In this case, for example, each computer may function as one of the model learning unit 11, the execution time estimation unit 12, the execution plan creation unit 14 and the noncompliance probability calculation unit 31.

Variation

Figure 31:
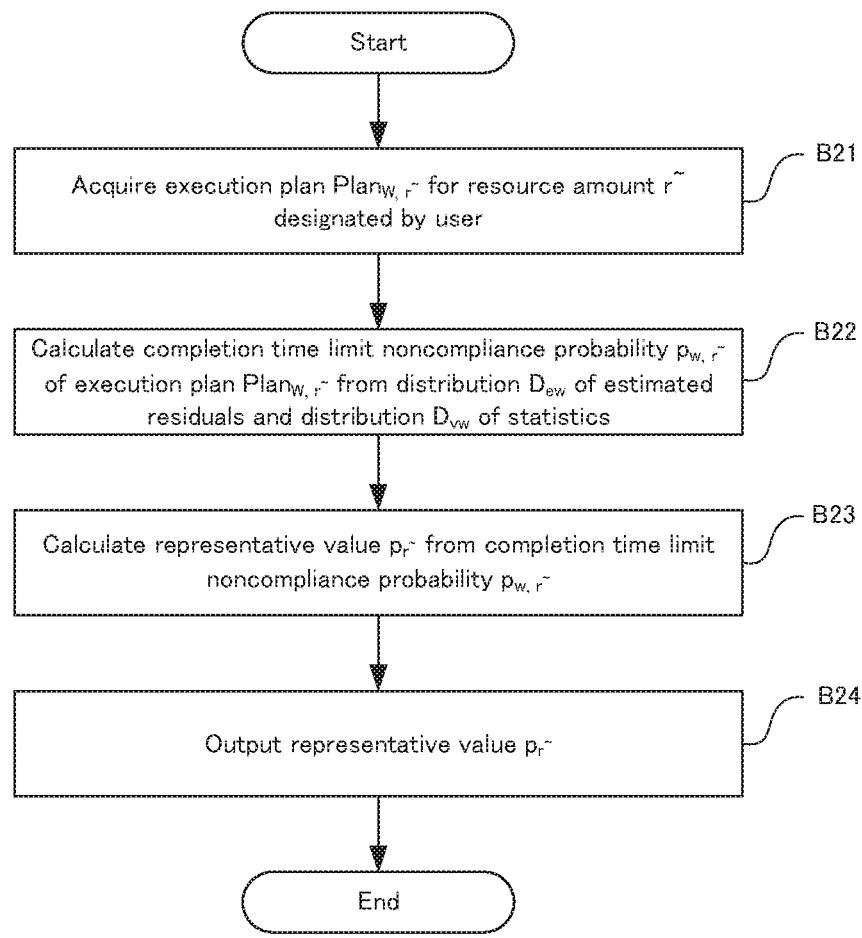
FIG. 31 is a flow diagram showing, in detail, another example of processing for calculating the completion time limit noncompliance probability in step B4 shown in FIG. 26.

Here, a variation in the second embodiment will be described. In this variation, the processing in the noncompliance probability calculation unit 31 differs from the example shown in FIG. 27. Hereinafter, the differences will be described using FIGS. 31 and 32. FIG. 31 is a flow diagram showing, in detail, another example of processing for calculating the completion time limit noncompliance probability in step B4 shown in FIG. 26. FIG. 32 is a diagram showing another example of the result of calculating the completion time limit noncompliance probability.

Initially, as shown in FIG. 31, the noncompliance probability calculation unit 31 acquires the execution plan $Plan_{W, r^\sim}$ for the resource amount $r^\sim$ designated by the user, from the execution plan creation unit 14 (step B21). Note that step B21 is a similar step to step B11 shown in FIG. 27.

Next, the noncompliance probability calculation unit 31 calculates the completion time limit noncompliance probability $p_{w, r^\sim}$ of the execution plan $Plan_{W, r^\sim}$, using the distribution $D_{ew}$ of estimated residuals and the distribution $D_{vw}$ of statistics (step B22).

Specifically, the noncompliance probability calculation unit 31 assumes that the distribution $D_{ew}$ of estimated residuals and the distribution $D_{vw}$ of statistics are normal distributions, and calculates probabilities for the execution time of data processing being greater than or equal to the completion time limit from the standard deviations of these normal distributions. The noncompliance probability calculation unit 31 then adopts the higher probability, out of the probability obtained from the normal distribution of the distribution $D_{ew}$ of estimated residuals and the probability obtained from the normal distribution of the distribution $D_{vw}$ of statistics, as the completion time limit noncompliance probability $p_{w, r^\sim}$ (step B23).

The results are as shown in FIG. 32. In the example in FIG. 32, the probability obtained from the normal distribution of the distribution $D_{vw}$ of statistics is adopted as the completion time limit noncompliance probability $p_{w, r^\sim}$ for the respective data processing $w_3$ and $w_4$.

Next, the noncompliance probability calculation unit 31 outputs the completion time limit noncompliance probability $p_{r^\sim}$ to the terminal device of the user (step B24). Specifically, only the largest value of the completion time limit noncompliance probability is similarly output in this variation.

In this way, in this variation, unlike the example shown in FIG. 27 in which sampling is performed, the completion time limit noncompliance probability $p_{r^\sim}$ is derived from the distribution $D_{ew}$ of estimated residuals and the distribution $D_v$ of statistics. Thus, according to this variation, the processing load can be reduced, and shortening of the time taken to calculate the completion time limit noncompliance probability $p_{r^\sim}$ can be achieved.

Physical Configuration

Figure 33:
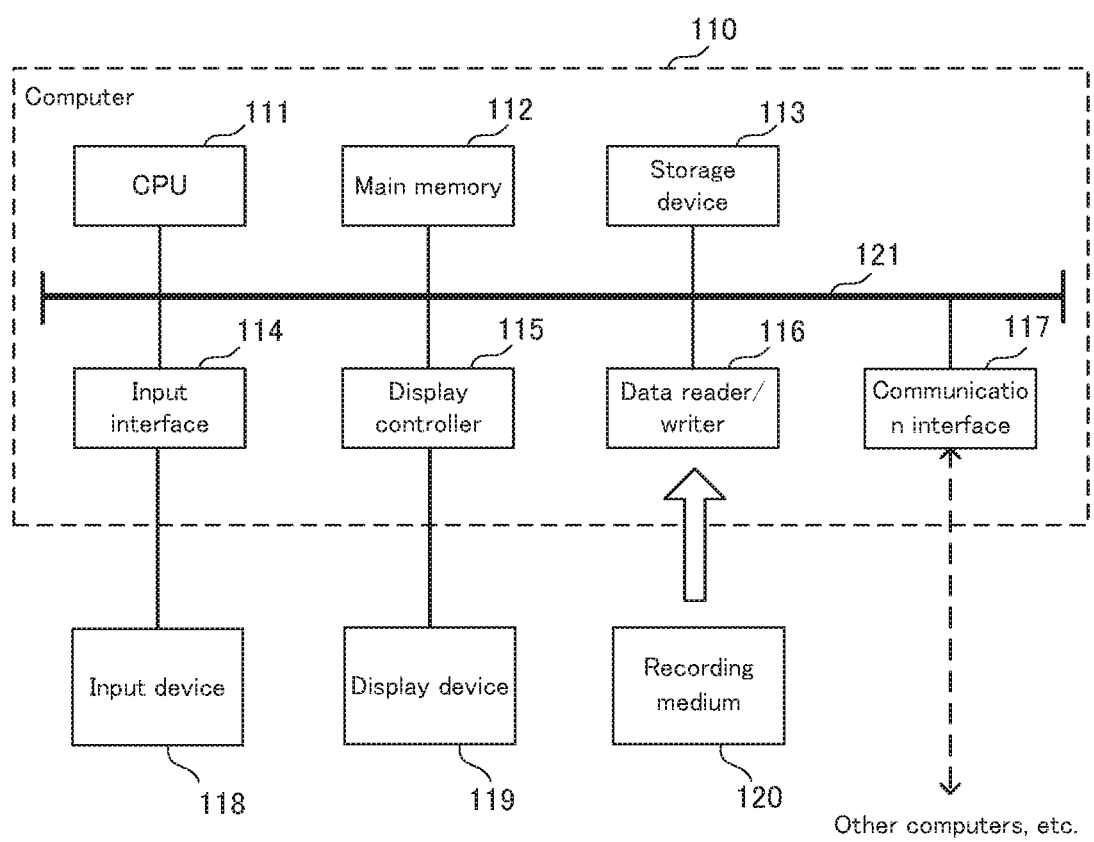
FIG. 33 is a block diagram showing an example of a computer that realizes the computational resource management device in the first and second embodiments of the present invention.

Here, the computer that realizes the computational resource management device by executing the computer programs in the first and second embodiments will be described using FIG. 33. FIG. 33 is a block diagram showing an example of the computer that realizes the computational resource management device in the first and second embodiments of the present invention.

As shown in FIG. 33, a computer 110 is provided with a CPU 111, a main memory 112, a storage device 113, an input interface 114, a display controller 115, a data reader/writer 116 and a communication interface 117. These units are communicably connected to each other, via a bus 121.

The CPU 111 implements various computations, by extracting the programs (codes) of the present embodiment stored in the storage device 113 to the main memory 112, and executing these programs in a predetermined order. The main memory 112 is, typically, a volatile storage device such as a DRAM (Dynamic Random Access Memory). Also, the programs in the present embodiment are provided in a state of being stored in a computer-readable recording medium 120. Note that the programs in the present embodiment may be distributed on the Internet connected via the communication interface 117.

Also, a semiconductor memory device such as a flash memory is given as a specific example of the storage device 113, in addition to a hard disk drive. The input interface 114 mediates data transmission between the CPU 111, and an input device 118 such as a keyboard and a mouse. The display controller 115 is connected to a display device 119, and controls display on the display device 119.

The data reader/writer 116 mediates data transmission between the CPU 111 and the recording medium 120, and executes readout of computer programs from the recording medium 120 and writing of processing results of the computer 110 to the recording medium 120. The communication interface 117 mediates data transmission between the CPU 111 and other computers.

Also, a general-purpose semiconductor storage device such as a CF (Compact Flash®) card or an SD (Secure Digital) card, a magnetic storage medium such as a flexible disk, and an optical storage medium such as a CD-ROM (Compact Disk Read Only Memory) are given as specific examples of the recording medium 120.

Note that the computational resource management device in the present embodiment is also realizable by using hardware corresponding to each unit, rather than by a computer on which computer programs are installed. Furthermore, part of the computational resource management device may be realized by programs, and the remaining part may be realized by hardware.

Part or all of the embodiments described above can be realized by Supplementary Notes 1 to 15 described below, but the present invention is not limited to the following recitation.

Supplementary Note 1

A computational resource management device for managing a system that performs data processing, including:

a model learning unit configured to use a measured value of an execution time of data processing, a measured value of a resource amount allocated to the data processing, and a feature of input data to the data processing as training data to learn a model indicating a relationship between the execution time and the resource;

an execution time estimation unit configured to input a feature of data scheduled to be input to data processing scheduled to be executed into the model to calculate an estimated value of the execution time of the scheduled data processing;

a resource amount calculation unit configured to use the estimated value of the execution time, a variation index indicating variation in the estimated value of the execution time that depends on change in a feature of data input in past data processing, and distribution of estimated residuals obtained during learning of the model to calculate a resource amount required in the scheduled data processing; and an execution plan creation unit configured to create an execution plan of the scheduled data processing, based on the estimated value of the execution time, the variation index, the distribution of estimated residuals, and the calculated resource amount.

Supplementary Note 2

The computational resource management device according to supplementary note 1, the model learning unit further using environment information specifying an environment in which data processing is executed to learn the model, and the execution time estimation unit further inputting environment information specifying an environment in which the scheduled data processing is to be executed into the model to calculate the estimated value of the execution time of the scheduled data processing.

Supplementary Note 3

The computational resource management device according to supplementary note 1 or 2, the execution plan creation unit, in a case where a threshold is set in advance for a probability of not complying with a completion time limit in the scheduled data processing, creating the execution plan of the scheduled data processing so as to not exceed the threshold.

Supplementary Note 4

A computational resource management device for managing a system that performs data processing, including:

a model learning unit configured to use a measured value of an execution time of data processing, a measured value of a resource amount allocated to the data processing, and a feature of input data to the data processing as training data to learn a model indicating a relationship between the execution time and the resource;

an execution time estimation unit configured to input a feature of data scheduled to be input to data processing scheduled to be executed into the model to calculate an estimated value of the execution time;

an execution plan creation unit configured to create an execution plan of the scheduled data processing, in a range of the resource amount designated in advance; and a noncompliance probability calculation unit configured to calculate a probability of the scheduled data processing not complying with a completion time limit, from the estimated value of the execution time, a variation index of the execution time that depends on change in a feature of data input in past data processing, distribution of estimated residuals obtained during learning of the model, and the created execution plan.

Supplementary Note 5

The computational resource management device according to supplementary note 4, the model learning unit further using environment information specifying an environment in which data processing is executed to learn the model, and the execution time estimation unit further inputting environment information specifying an environment in which the scheduled data processing is to be executed into the model to calculate the estimated value of the execution time of the scheduled data processing.

Supplementary Note 6

A computational resource management method for managing a system that performs data processing, including:

(a) a step of using a measured value of an execution time of data processing, a measured value of a resource amount allocated to the data processing, and a feature of input data to the data processing as training data to learn a model indicating a relationship between the execution time and the resource;

(b) a step of inputting a feature of data scheduled to be input to data processing scheduled to be executed into the model to calculate an estimated value of the execution time of the scheduled data processing;

(c) a step of using the estimated value of the execution time, a variation index indicating variation in the estimated value of the execution time that depends on change in a feature of data input in past data processing, and distribution of estimated residuals obtained during learning of the model to calculate a resource amount required in the scheduled data processing; and (d) a step of creating an execution plan of the scheduled data processing, based on the estimated value of the execution time, the variation index, the distribution of estimated residuals, and the calculated resource amount.

Supplementary Note 7

The computational resource management method according to supplementary note 6, in the step of (a), environment information specifying an environment in which data processing is executed being further used to learn the model, and in the step of (b), environment information specifying an environment in which the scheduled data processing is to be executed being further input into the model to calculate the estimated value of the execution time of the scheduled data processing.

Supplementary Note 8

The computational resource management method according to supplementary note 6 or 7, in the step of (d), in a case where a threshold is set in advance for a probability of not complying with a completion time limit in the scheduled data processing, the execution plan of the scheduled data processing being created so as to not exceed the threshold.

Supplementary Note 9

A computational resource management method for managing a system that performs data processing, including:

(a) a step of using a measured value of an execution time of data processing, a measured value of a resource amount allocated to the data processing, and a feature of input data to the data processing as training data to learn a model indicating a relationship between the execution time and the resource;

(b) a step of inputting a feature of data scheduled to be input to data processing scheduled to be executed into the model to calculate an estimated value of the execution time;

(c) a step of creating an execution plan of the scheduled data processing, in a range of the resource amount designated in advance; and (d) a step of calculating a probability of the scheduled data processing not complying with a completion time limit, from the estimated value of the execution time, a variation index of the execution time that depends on change in a feature of data input in past data processing, distribution of estimated residuals obtained during learning of the model, and the created execution plan.

Supplementary Note 10

The computational resource management method according to supplementary note 9, in the step of (a), environment information specifying an environment in which data processing is executed being further used to learn the model, and in the step of (b), environment information specifying an environment in which the scheduled data processing is to be executed being further input into the model to calculate the estimated value of the execution time of the scheduled data processing.

Supplementary Note 11

A computer-readable recording medium on which is recorded a computer program for managing, by computer, a system that performs data processing, the computer program including a command for causing the computer to execute:

(a) a step of using a measured value of an execution time of data processing, a measured value of a resource amount allocated to the data processing, and a feature of input data to the data processing as training data to learn a model indicating a relationship between the execution time and the resource;

(b) a step of inputting a feature of data scheduled to be input to data processing scheduled to be executed into the model to calculate an estimated value of the execution time of the scheduled data processing;

(c) a step of using the estimated value of the execution time, a variation index indicating variation in the estimated value of the execution time that depends on change in a feature of data input in past data processing, and distribution of estimated residuals obtained during learning of the model to calculate a resource amount required in the scheduled data processing; and (d) a step of creating an execution plan of the scheduled data processing, based on the estimated value of the execution time, the variation index, the distribution of estimated residuals, and the calculated resource amount.

Supplementary Note 12

The computer-readable recording medium according to supplementary note 11, in the step of (a), environment information specifying an environment in which data processing is executed being further used to learn the model, and in the step of (b), environment information specifying an environment in which the scheduled data processing is to be executed being further input into the model to calculate the estimated value of the execution time of the scheduled data processing.

Supplementary Note 13

The computer-readable recording medium according to supplementary note 11 or 12, in the step of (d), in a case where a threshold is set in advance for a probability of not complying with a completion time limit in the scheduled data processing, the execution plan of the scheduled data processing being created so as to not exceed the threshold.

Supplementary Note 14

A computer-readable recording medium on which is recorded a computer program for managing, by computer, a system that performs data processing, the computer program including a command for causing the computer to execute:

(a) a step of using a measured value of an execution time of data processing, a measured value of a resource amount allocated to the data processing, and a feature of input data to the data processing as training data to learn a model indicating a relationship between the execution time and the resource;

(b) a step of inputting a feature of data scheduled to be input to data processing scheduled to be executed into the model to calculate an estimated value of the execution time;

(c) a step of creating an execution plan of the scheduled data processing, in a range of the resource amount designated in advance; and (d) a step of calculating a probability of the scheduled data processing not complying with a completion time limit, from the estimated value of the execution time, a variation index of the execution time that depends on change in a feature of data input in past data processing, distribution of estimated residuals obtained during learning of the model, and the created execution plan.

Supplementary Note 15

The computer-readable recording medium according to supplementary note 14, in the step of (a), environment information specifying an environment in which data processing is executed being further used to learn the model, and in the step of (b), environment information specifying an environment in which the scheduled data processing is to be executed being further input into the model to calculate the estimated value of the execution time of the scheduled data processing.

Although the instant invention has been described above with reference to embodiments, the invention is not intended to be limited to the above embodiments. A person skilled in the art will appreciate that the configurations and details of the instant invention can be variously modified within the scope of the invention.

This application claims priority based on Japanese Application No. 2016-090728 filed on Apr. 28, 2016, and the entire contents thereof are hereby incorporated herein.

INDUSTRIAL APPLICABILITY

As described above, according to the present invention, an execution plan in data analysis can be formulated with consideration for indeterminate variation in the processing time. The present invention is useful in various fields in which formulation of an execution plan in data analysis is required.

LIST OF REFERENCE SIGNS

10 Computational resource management device (first embodiment)
11 Model learning unit
12 Execution time estimation unit
13 Resource amount calculation unit
14 Execution plan creation unit 20 Data processing system
21 Execution unit
30 Computational resource management device (second embodiment)
31 Noncompliance probability calculation unit
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A computational resource management device for managing a system that performs data processing, comprising:
a processor; and
a memory storing instructions executable by the processor to:
use a measured value of an execution time of data processing, a measured value of a resource amount allocated to the data processing, and a feature of input data to the data processing as training data to learn a model indicating a relationship between the execution time and the resource;
input a feature of data scheduled to be input to data processing scheduled to be executed into the model to calculate an estimated value of the execution time of the scheduled data processing;
generate, as a variation index, a distribution of statistics relating to changes in the feature of data, the variation index indicating variation in the estimated value of the execution time that depends on change in the feature of data input in past data processing;
applies a specific function to a learning error of an estimation function to calculate a distribution of estimated residuals, during learning of the model;
use the estimated value of the execution time, the variation index, and the distribution of estimated residuals to calculate a resource amount required in the scheduled data processing; and
create an execution plan of the scheduled data processing, based on the estimated value of the execution time, the variation index, the distribution of estimated residuals, and the calculated resource amount.

2. The computational resource management device according to claim 1, wherein the instructions are executable by the processor to further:
use environment information specifying an environment in which data processing is executed to learn the model, and
input environment information specifying an environment in which the scheduled data processing is to be executed into the model to calculate the estimated value of the execution time of the scheduled data processing.

3. The computational resource management device according to claim 1, wherein the instructions are executable by the processor to further: in a case where a threshold is set in advance for a probability of not complying with a completion time limit in the scheduled data processing, creates the execution plan of the scheduled data processing so as to not exceed the threshold.

4. A computational resource management method for managing a system that performs data processing, comprising:
using a measured value of an execution time of data processing, a measured value of a resource amount allocated to the data processing, and a feature of input data to the data processing as training data to learn a model indicating a relationship between the execution time and the resource;
inputting a feature of data scheduled to be input to data processing scheduled to be executed into the model to calculate an estimated value of the execution time of the scheduled data processing;
generating, as a variation index, a distribution of statistics relating to changes in the feature of data, the variation index indicating variation in the estimated value of the execution time that depends on change in the feature of data input in past data processing;
applying a specific function to a learning error of an estimation function to calculate a distribution of estimated residuals, during learning of the model;
using the estimated value of the execution time, the variation index, and the distribution of estimated residuals to calculate a resource amount required in the scheduled data processing; and
creating an execution plan of the scheduled data processing, based on the estimated value of the execution time, the variation index, the distribution of estimated residuals, and the calculated resource amount.

5. The computational resource management method according to claim 4,
wherein environment information specifying an environment in which data processing is executed is further used to learn the model, and
environment information specifying an environment in which the scheduled data processing is to be executed is further input into the model to calculate the estimated value of the execution time of the scheduled data processing.

6. The computational resource management method according to claim 4, wherein, in a case where a threshold is set in advance for a probability of not complying with a completion time limit in the scheduled data processing, the execution plan of the scheduled data processing is created so as to not exceed the threshold.

7. A non-transitory computer-readable recording medium on which is recorded a computer program for managing, by computer, a system that performs data processing, the computer program including a command for causing the computer to execute processing comprising:
using a measured value of an execution time of data processing, a measured value of a resource amount allocated to the data processing, and a feature of input data to the data processing as training data to learn a model indicating a relationship between the execution time and the resource;
inputting a feature of data scheduled to be input to data processing scheduled to be executed into the model to calculate an estimated value of the execution time of the scheduled data processing;
generating, as a variation index, a distribution of statistics relating to changes in the feature of data, the variation index indicating variation in the estimated value of the execution time that depends on change in the feature of data input in past data processing;

applying a specific function to a learning error of an estimation function to calculate a distribution of estimated residuals, during learning of the model;

using the estimated value of the execution time, the variation index, and the distribution of estimated residuals to calculate a resource amount required in the scheduled data processing; and creating an execution plan of the scheduled data processing, based on the estimated value of the execution time, the variation index, the distribution of estimated residuals, and the calculated resource amount.

8. The non-transitory computer-readable recording medium according to claim 7, wherein environment information specifying an environment in which data processing is executed is further used to learn the model, and environment information specifying an environment in which the scheduled data processing is to be executed is further input into the model to calculate the estimated value of the execution time of the scheduled data processing.

9. The non-transitory computer-readable recording medium according to claim 7, wherein, in a case where a threshold is set in advance for a probability of not complying with a completion time limit in the scheduled data processing, the execution plan of the scheduled data processing is created so as to not exceed the threshold.

* * * * *